United States Patent
Russell et al.

(10) Patent No.: US 11,429,709 B2
(45) Date of Patent: Aug. 30, 2022

(54) INTERFACING WITH A ONE-WIRE DEVICE THAT IS IN PARALLEL WITH A LOW-IMPEDANCE ELEMENT, AND RELATED SYSTEMS AND DEVICES

(71) Applicant: Microchip Technology Incorporated, Chandler, AZ (US)

(72) Inventors: Daniel J. Russell, Colorado Springs, CO (US); Albert S. Weiner, Colorado Springs, CO (US); Suraj Sridhar, Colorado Springs, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 135 days.

(21) Appl. No.: 16/803,865

(22) Filed: Feb. 27, 2020

(65) Prior Publication Data

US 2021/0110022 A1   Apr. 15, 2021

Related U.S. Application Data

(60) Provisional application No. 62/913,283, filed on Oct. 10, 2019.

(51) Int. Cl.
*H04L 29/06* (2006.01)
*G06F 21/44* (2013.01)

(52) U.S. Cl.
CPC .................................. *G06F 21/44* (2013.01)

(58) Field of Classification Search
CPC ........... G06F 21/44; G06F 21/45; G06F 21/30
See application file for complete search history.

(56) References Cited

U.S. PATENT DOCUMENTS

| 9,423,152 B2 | 8/2016 | Ampolini et al. |
| 2012/0131353 A1* | 5/2012 | Nasir ............... G06F 21/42 713/189 |
| 2013/0322010 A1* | 12/2013 | Hung ............... G06F 1/1632 361/679.41 |
| 2018/0132530 A1 | 5/2018 | Rogers et al. |

FOREIGN PATENT DOCUMENTS

WO   2007/085383 A1   8/2007

OTHER PUBLICATIONS

International Search Report of International Application No. PCT/US2020/020208, dated Jun. 16, 2020, 4 pages.
(Continued)

*Primary Examiner* — Jason K Gee
(74) *Attorney, Agent, or Firm* — TraskBritt

(57) ABSTRACT

Some embodiments of the present disclosure relate to a system that may include a replaceable module and a user device. The replaceable module may include an element and a one-wire authentication element in parallel with the element. The user device may be configured for operable coupling with the replaceable module. The user device may include a power source configured to provide power to the element, an authentication unit configured to perform a verification process for verifying authenticity of the replaceable module, and a signal conditioning unit arranged in a communication path between the one-wire authentication element and the authentication unit.

12 Claims, 14 Drawing Sheets

(56) References Cited

OTHER PUBLICATIONS

International Written Opinion of International Application No. PCT/US2020/020208, dated Jun. 16, 2020, 8 pages.
Atmel Corporation, "Atmel CryptoAuthentication", Summary Datasheet, ATECC108, (2013), 11 pages.
Microchip Technology Inc., "32-bit ARM (Registered) Cortex (Registered)-M4F MCUs with 1 Msps 12-bit ADC, QSPI, USB, Ethernet, and PTC", SAM D5x/E5x Family Data Sheet, DS60001507E, (2019), 2130 pages.
Microchip Technology Inc., "ATECC508A CryptoAuthentication Device Complete Data Sheet", DS20005927A, (2017), 109 pages.
Microchip Technology Inc., "ATSHA204A Microchip CryptoAuthentication Data Sheet", DS40002025A, (2018), 93 pages.
Microchip Technology Inc., "Ultra Low-Power, 32-bit Cortex-M23 MCUs with TrustZone, Crypto, and Enhanced PTC", SAM L10/L11 Family, DS60001513C, (2019), 1217 pages.

* cited by examiner

INTERFACING WITH A ONE-WIRE DEVICE THAT IS IN PARALLEL WITH A LOW-IMPEDANCE ELEMENT, AND RELATED SYSTEMS AND DEVICES

CROSS-REFERENCE TO RELATED APPLICATIONS

This application claims the benefit under 35 U.S.C. § 119(e) of U.S. Provisional Patent Application Ser. No. 62/913,283, filed Oct. 10, 2019, entitled "INTERFACING WITH A ONE-WIRE DEVICE IN PARALLEL WITH A LOW-IMPEDANCE ELEMENT, AND RELATED SYSTEMS AND DEVICES," the disclosure of which is hereby incorporated herein in its entirety by this reference.

BACKGROUND

A one-wire device communication protocol may allow a one-wire device to communicate (using digital signaling) using a single pin as both the input to the device and as the output from the device.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
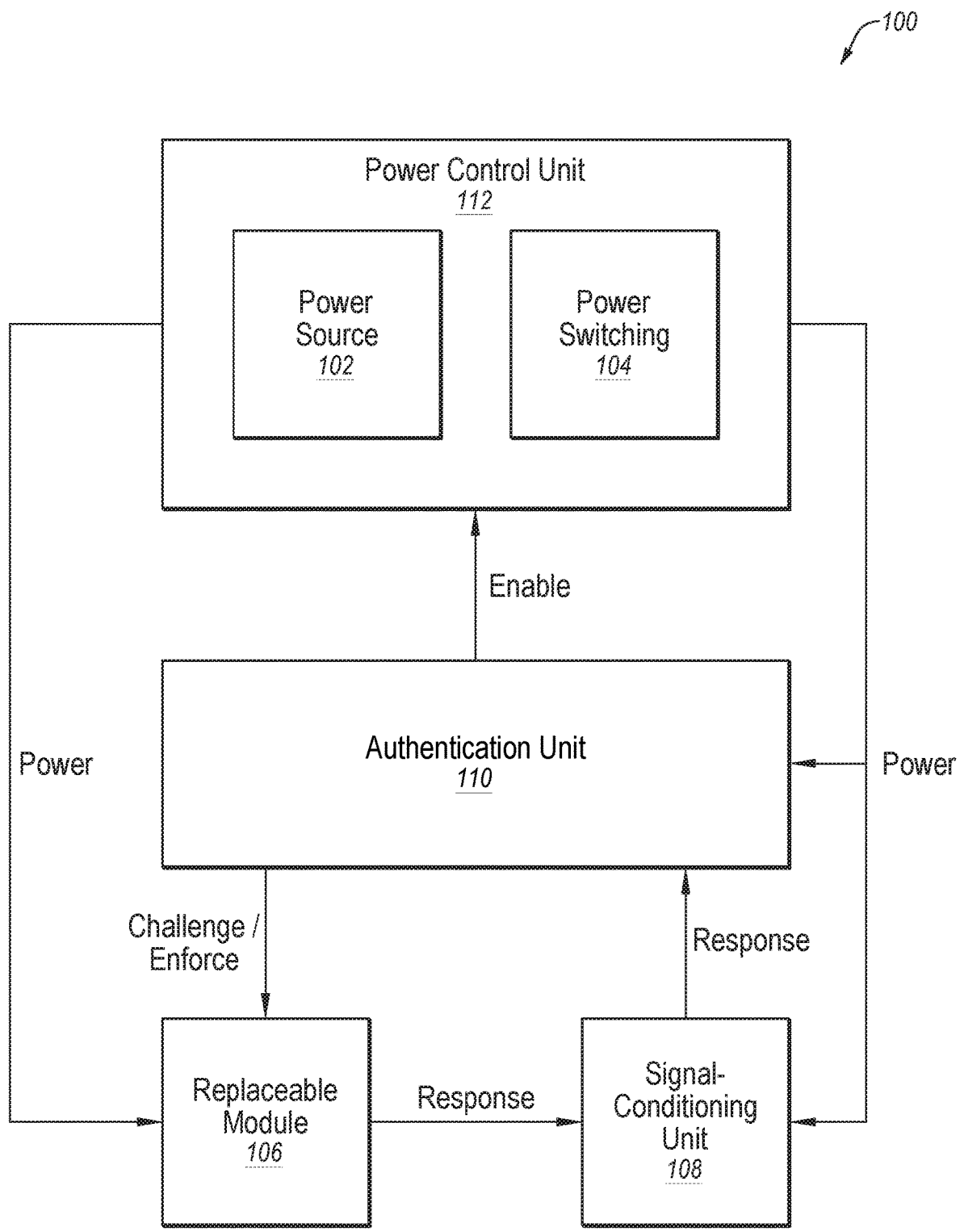
FIG. 1 illustrates a functional block diagram of a system in accordance with one or more embodiments.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a digital signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, "one-wire element" or "one-wire device" means a device that combines digital input/output and power delivery using a single pin. As a non-limiting example, such an element may be configured to detect voltage at the single pin of the one-wire element (relative to another pin of the one-wire element) and use the detected voltage as an input. As a non-limiting example, a one-wire element may be arranged between a first voltage line and a second voltage line (which second voltage line is connected to a circuit ground). Another device may be configured to alter a voltage and/or current on the voltage lines (with the voltage alteration being relative to the other voltage line). The one-wire element may detect the alterations in the voltage and/or current and interpret a signal based on the alterations, while continuing to operate internally when its input power is reduced to zero. The one-wire element may receive a digital message based on alterations of the voltage and/or current on the first voltage line.

Additionally, the one-wire element may be configured to alter voltage and/or current at the single pin to provide an output. As a non-limiting example, a one-wire element may be arranged between a first voltage line and a second voltage line. During a contemplated operation, the one-wire element may prevent (i.e., prevent or substantially impede) current-flow through the one-wire element, leaving the first voltage line at a reference voltage, or the one-wire element may allow current-flow (i.e., allow current-flow or allow an increased amount of current-flow) through the one-wire element, pulling the first voltage line to near the voltage of the second voltage line. The one-wire element may transmit a signal (e.g., one bit at a time, without limitation) by altering or not altering the voltage and/or current of the voltage line. Another device arranged to measure a voltage and/or a current at the first voltage line may detect the alterations in the voltage and/or current and receive and/or interpret the signal of the one-wire element. As a non-limiting example, the other device may be arranged between the first voltage line and the second voltage line and may measure the voltage of the first voltage line relative to the second voltage line and thereby receive a signal from the one-wire element based on alterations in the voltage of the first voltage line. As another non-limiting example, the other device may be arranged to measure a current or voltage of another point or line and receive the digital signal from the one-wire element based on the measured current or voltage of the other point or line.

In some use cases, it may be advantageous to have a one-wire device in parallel with a low-impedance element. When a one-wire device is in parallel with a low-impedance element, the change in voltage and/or current as a result of the operation of the one-wire device may be insufficient to communicate. As a non-limiting example, the change in voltage and/or current may be below the range corresponding to a communication protocol or not be within the operational domain of a digital input of another device receiving the communication signals.

Consider a non-limiting example in which a one-wire element is in parallel with a low-impedance element (forming a parallel circuit) and the impedance of the one-wire element (when allowing current to flow (or increased current flow) from the single pin to the ground pin) is ten (or more) times greater than an impedance of the low-impedance element. When the one-wire element attempts to generate a digital signal, it may draw as little as one tenth (or less) of the current of the low-impedance element. So, in a case where a 3 Amp static current powers the parallel circuit, the one-wire device modulates a 3 A static current with a 300 mA data signal. This amount of current change may be insufficient to produce a signal large enough to be within an operational domain of a digital device receiving the signal.

One or more embodiments of the present disclosure may include a one-wire element in parallel with a low-impedance element. One or more embodiments may provide for communication to and/or from the one-wire element that is in parallel with the low-impedance element. One or more embodiments may include an interface including signal-conditioning elements configured to receive a signal generated by a one-wire element in parallel with a low-impedance device and recover and amplify a digital signal used by the one-wire element to communicate.

An embodiment may generally relate to a system that includes a replaceable module and a user device configured for operable coupling with the replaceable module. The replaceable module may include a low-impedance element and a one-wire authentication element in parallel with the low-impedance element. The user device may include a power source and/or include means for operable coupling to a power source. As described in more detail below, the means for operable coupling may include one or more of an electrical coupling and a mechanical coupling. The electrical coupling may include electrical contacts configured to transfer power between the user device and the power source. The mechanical coupling may include, as non-limiting examples, a slot, a void, a gap, a clip, a spring, or threads configured to retain the power source relative to the user device user device. The user device may be configured to provide power to the replaceable module (including the low-impedance element and the one-wire authentication element). The user device may be configured to perform a verification process for verifying authenticity of the replaceable module.

FIG. 1 illustrates a functional block diagram of system 100 in accordance with one or more embodiments. System 100 may include power source 102, power switching 104, replaceable module 106, signal-conditioning unit 108, authentication unit 110, and power control unit 112.

System 100 may be configured to provide power to replaceable module 106. Additionally, system 100 may be configured to authenticate replaceable module 106. Power source 102 may supply power to system 100. Power source 102 may include a direct current (DC) voltage source, e.g., a replaceable battery, a rechargeable battery, a solar cell, or a transformer, without limitation.

Power switching 104 may be configured to connect or disconnect power source 102 from the various other elements of system 100. Power switching 104 may be configured to complete a circuit between power source 102, various elements of system 100, and a relative circuit ground.

Power switching 104 may include any suitable means for alternately forming, and breaking, an electrical connection e.g., a physical switch, diode, or a transistor, without limitation. Power switching 104 may include any number of means for alternately forming and breaking connections. As a non-limiting example, power switching 104 may include means for alternately forming and breaking electrical connections between power source 102 and each of replaceable module 106, signal-conditioning unit 108, and authentication unit 110. In some embodiments, power switching 104 may include multiple means for alternately forming and breaking connections between power source 102 and any of the other elements. As a specific non-limiting example, power switching 104 may include two switches between power source 102 and replaceable module 106 such that both of the two switches must be switched to a certain state in order for power to flow from power source 102 to replaceable module 106.

In the case where system 100 is used in a user device, power switching 104 may include an external button (e.g., an on/off button or switch, without limitation) that may be tied to one or more electrical connections between power source 102 and other elements of system 100. As a specific, non-liming example, the external button may be configured to make or break an electrical connection between power source 102 and replaceable module 106. Additionally, as described above, power switching 104 may include an additional switch that may be configured to alternately complete or break a circuit that would power replaceable module 106.

Power control unit 112 may be configured, generally, to control power switching 104 to variously connect power source 102 with other elements of system 100, including, but not limited to, in response to control signals from authentication unit 110 (e.g., an Enable signal generated by authentication unit 110 in response to successfully authenticating a replaceable module 106 as described herein, without limitation). As a specific, non-limiting example, power control unit 112 may include logic circuitry (not shown) for determining when to enable and disable supply of power from power source 102 to one or more of signal-conditioning unit 108, authentication unit 110, and replaceable module 106. Power source 102 and power switching 104 are depicted by FIG. 1 as elements of power control unit 112 to illustrate that power control unit 112 may be configured to control (i.e., directly and/or indirectly control the operations of), at least in part, supply of power from power source 102, and more specifically, power switching 104 with regard to power source 102. Power control unit 112 may be, and/or include, one or more modules, circuits, processors, controllers, and/or state machines configured to perform features and functions of embodiments of power control unit 112 described herein. As non-limiting examples, a microprocessor and/or microcontroller may be configured to perform one or more of the features or functions of embodiments of power control unit 112 described herein (e.g., microprocessor 114 depicted by FIG. 6A and FIG. 6B).

Replaceable module 106 may be configured to provide an authentication response of a challenge-response authentication process and to perform one or more other functions. Other functions may include, as non-limiting examples, heating, lighting, and/or sensing. In one or more embodiments, replaceable module 106 may include a low-impedance element in parallel with a one-wire element. An embodiment of replaceable module 106 is described below with regard to replaceable module 200 of FIG. 2. In some embodiments, replaceable module 106 may include a heating element in parallel with an Integrated Circuit (IC), the IC being configured to provide an authentication response. In some embodiments, replaceable module 106 may be configured to provide an authentication response to an authentication challenge, including an authentication challenge provided by authentication unit 110.

Figure 4:
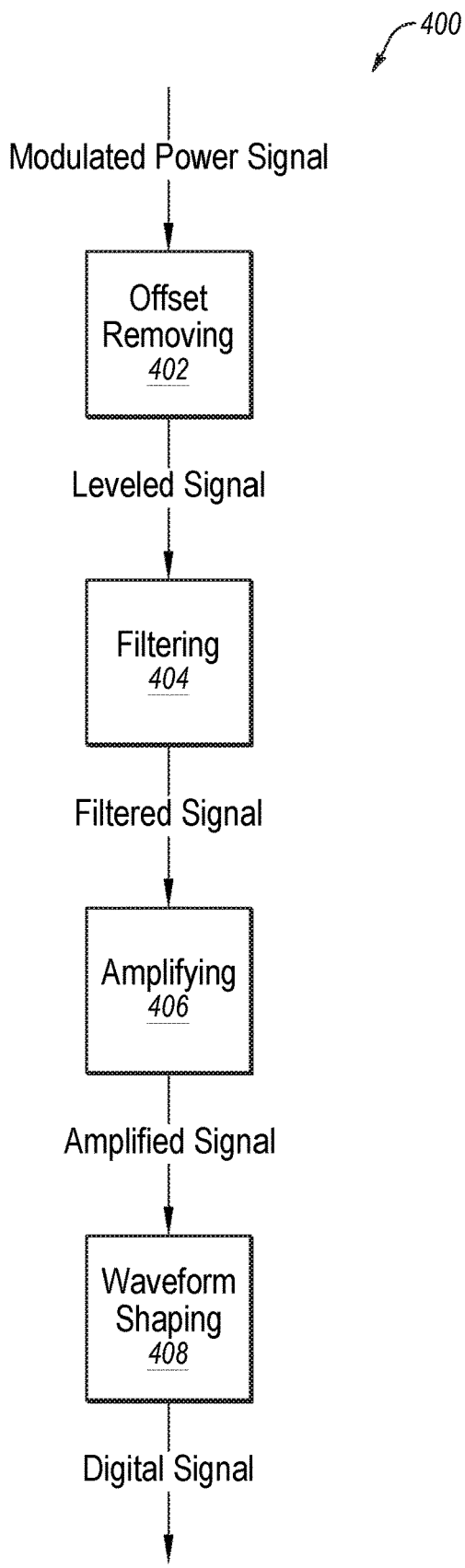
FIG. 4 illustrates a functional block diagram of a signal-conditioning flow in accordance with one or more embodiments.

Signal-conditioning unit 108 may be configured to receive and condition signals carrying communication messages including, without limitation, authentication responses provided by replaceable module 106, and provide a conditioned authentication response to authentication unit 110. In a contemplated operation, replaceable module 106 may generate a digital signal for carrying an authentication response and signal-conditioning unit 108 may detect, receive, recover, and/or amplify the digital signal such that it is interpretable (e.g., within an operational range of a digital input, without limitation) by authentication unit 110. As non-limiting examples, signal-conditioning unit 108 may be configured to perform operations to do one or more of: remove a voltage bias from the signal, filter the signal (to remove noise), amplify the signal, and shape the signal. Example contemplated operations of a signal-conditioning flow that signal-conditioning unit 108 may be configured to perform are depicted in FIG. 4 as signal-conditioning flow 400.

In some cases, signal-conditioning unit 108 may be configured to condition the signal during certain periods of time (e.g., when replaceable module 106 is expected to be generating a signal and/or after an authentication challenge has been sent, without limitation) and to not operate during other periods of time. Thus, as discussed herein, signal-conditioning unit 108 may include one or more optional inputs that may be usable by system 100 to determine and/or control when signal-conditioning unit 108 operates. Additionally or alternatively, power control unit 112 may be configured to control power switching 104 to provide power to signal-conditioning unit 108 during the certain periods of time and not during the other periods of time. As a non-limiting example, causing signal-conditioning unit 108 to operate during the certain periods of time and to not operate during the other periods of time may conserve power consumed by system 100.

Authentication unit 110 may be configured to authenticate replaceable module 106 by providing the authentication challenge and/or verifying the authentication response, without limitation. Authentication unit 110 may be configured to provide an authentication challenge to replaceable module 106. Authentication unit 110 may be configured to receive (through signal-conditioning unit 108) an authentication response from replaceable module 106, to determine whether the authentication response is valid or invalid, and to verify replaceable module 106 in response to the authentication response being valid or invalid.

Authentication unit 110 may be, and/or include, one or more modules, circuits, processors, controllers, and/or state machines configured to perform features and functions of embodiments of authentication unit 110 described herein. As non-limiting examples, a microprocessor and/or microcontroller may be configured to perform one or more of the features or functions of embodiments of authentication unit 110 described herein. In various embodiments, one or more microprocessors and/or microcontrollers may be configured to perform the features or functions of embodiments of both authentication unit 110 and power control unit 112.

In various contemplated operations of system 100, authentication unit 110 may indirectly control the flow of current to replaceable module 106 and components thereof by directing operation of power switching 104 via power control unit 112. More specifically, authentication unit 110 may be configured to send a signal (depicted in FIG. 1 as "Enable") to power control unit 112. As non-limiting examples, Enable may instruct power control unit 112 to allow current to flow through replaceable module 106 or inform power control unit 112 of a condition for allowing (or inhibiting) current to flow through replaceable module 106. Power control unit 112 may be configured to use a switch of power switching 104 e.g., a switch between replaceable module 106 and a relative ground, without limitation, as an enforcement mechanism to allow current to flow through replaceable module 106 in response to an indication of (or detecting a condition associated with) authentication response being valid (e.g., as indicated by an Enable signal generated by authentication unit 110, without limitation) and to prevent current from flowing through replaceable module 106 in response to receiving an indication of (or detecting a condition associated with) an invalid authentication response. Non-limiting examples of receiving an invalid authentication response include not receiving or detecting an authentication response, not receiving an authentication response within a specified period of time of sending an authentication challenge, and receiving an authentication response that includes incorrect authentication information. A person having ordinary skill in the art would understand that a signal, such as Enable depicted by FIG. 1, may be fixed (e.g., fixed as enabled) without exceeding the scope of this disclosure.

The lines depicted by FIG. 1 between various elements of system 100 represent one or more of physical connections, electrical connections, logical connections, and/or communicative connections, without limitation. Lines annotated with words and arrows depict additional communications and/or operations of features and/or functions of embodiments described herein. Another embodiment relates, generally, to a replaceable module that includes a low-impedance element and a one-wire authentication element in parallel with the low-impedance element. The one-wire authentication element may include a one-wire device for providing a response of a challenge-response pair. The low-impedance element may have a lower impedance relative to the impedance of the one-wire authentication element. The replaceable module may have two external pins (a first external pin and a second external pin) for interfacing with elements external to the replaceable module. A first external pin may be operatively coupled to the low-impedance element and an input/output pin of the one-wire authentication element. A second external pin may be operatively coupled to the low-impedance element and a ground pin of the one-wire authentication element. The low-impedance element and the one-wire authentication element may be arranged in parallel as a parallel circuit in the replaceable module.

Figure 2:
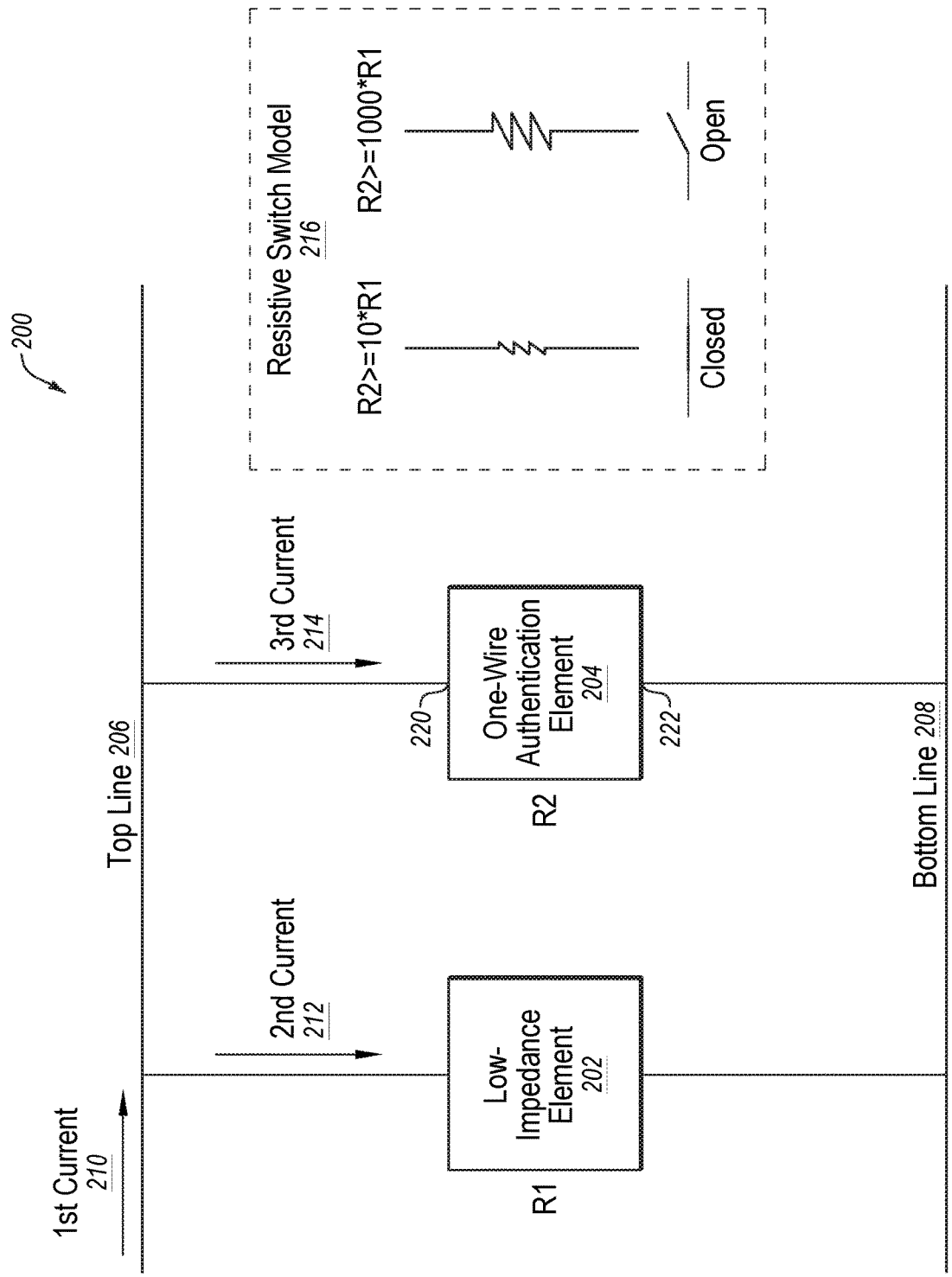
FIG. 2 illustrates a functional block diagram of a replaceable module in accordance with one or more embodiments.

FIG. 2 illustrates a functional block diagram of replaceable module 200 in accordance with one or more embodiments. The replaceable module 200 is an example of one embodiment of the replaceable module 106 of FIG. 1. As depicted in FIG. 2, replaceable module 200 may include low-impedance element 202 and one-wire authentication element 204. Replaceable module 200 may include a first connection between a first side of low-impedance element 202 and input/output pin 220 of one-wire authentication element 204. The first connection is depicted as top line 206, which may include one or more electrical connections. Replaceable module 200 may include a second connection between a second side of low-impedance element 202 and ground pin 222 of one-wire authentication element 204. The second connection is depicted as bottom line 208, which may include one or more electrical connections.

Low-impedance element 202 and one-wire authentication element 204, connected by top line 206 and bottom line 208, form parallel circuit 218 (i.e., low-impedance element 202 may be arranged electrically in parallel with one-wire authentication element 204). Parallel circuit 218 may divide a first current 210 between parallel current paths (i.e., a second current 212 may flow through a current path through low-impedance element 202 and a third current 214 may flow through a current path through one-wire authentication element 204).

Low-impedance element 202 may include one or more elements that have an impedance that is small relative to the impedance of one-wire authentication element 204. Low-impedance element 202 may include, as non-limiting examples, a heating element, a light, or a sensor. In one embodiment the impedance of low-impedance element 202 is less than, or equal to, $\frac{1}{10}$ of the impedance of one-wire authentication element 204.

One-wire authentication element 204 may be configured to provide outputs (i.e., output signals for carrying messages) that may be used to authenticate one-wire authentication element 204, and by extension, replaceable module 200. Authentication unit 110 of FIG. 1 may be configured to receive the outputs of one-wire authentication element 204, after conditioning by signal-conditioning unit 108, and authenticate one-wire authentication element 204 and/or replaceable module 200. One-wire authentication element 204 may include a one-wire device, e.g., a one-wire integrated circuit (IC), without limitation. One-wire authentication element 204 may include a cryptographic IC (not shown) which may be configured to perform one or more cryptographic operations to generate an authentication response to an authentication challenge. Non-limiting examples of the one-wire authentication element 204 include a secure hash algorithm (SHA)-based crypto authentication crypto element (such as the ATSHA204, ATSHA206, and ATSHA256 commercially available from Microchip Technology Incorporated, without limitation) or an elliptic-curve cryptography (ECC)-based crypto authentication crypto element (such as the ATECC108, ATECC508, and ECC608 by Microchip Technology Incorporated and similar devices, without limitation).

In some cases, a one-wire authentication element 204 may be configured to provide an output (an authentication signal) without having first received an authentication challenge. As a non-limiting example, one-wire authentication element 204 may be configured to power on, then wait a predetermined duration of time, then provide the authentication signal. As another non-limiting example, one-wire authentication element 204 may be configured to provide an authentication signal at regular intervals.

One-wire authentication element 204 may be configured to receive inputs (e.g., at input/output pin 220). One-wire authentication element 204 may be configured to detect a voltage differential between top line 206 and bottom line 208. One-wire authentication element 204 may be configured to interpret changes in the voltage differential as an input. As a non-limiting example, a first voltage differential that satisfies a first threshold may be treated as a "high" input or a logical "1" (e.g., when the difference between the voltage of top line 206 and bottom line 208 is greater than 2 Volts, one-wire authentication element 204 may interpret this as a "1" input, without limitation), and a second voltage differential that satisfies a second threshold may be treated as a "low" input or a logical "0" (e.g., when the difference between the voltage of top line 206 and bottom line 208 is less than 2 Volts, one-wire authentication element 204 may interpret this as a "0" input, without limitation).

One-wire authentication element 204 may be configured to provide output signals at input/output pin 220. One-wire authentication element 204 may be configured to alter a voltage and/or current at input/output pin 220 in a way that may be detectable and interpretable as an output signal. As a non-limiting example, one-wire authentication element 204 may be configured to alter a voltage and/or a current at input/output pin 220 by alternating between increasing and decreasing the third current 214 flowing from top line 206 to bottom line 208.

Such increasing and decreasing of the third current 214 by the one-wire authentication element may be modeled as the one-wire authentication element 204 alternating between a low-impedance mode of operation and a high-impedance mode of operation. The low-impedance mode of operation may be modeled as allowing a large amount of the third current 214 to flow through the one-wire authentication element 204 (e.g., by setting an internal impedance of the one-wire authentication element 204 low (e.g., 100 Ohms)). The high-impedance mode of operation could be modeled as preventing or restricting the third current 214 from flowing through the one-wire authentication element 204 (e.g., by setting an internal impedance of the one-wire authentication element 204 high (e.g., 10 kiloOhms or higher)). Thus, in some cases, one-wire authentication element 204 may be modeled as a resistive switch.

Figure 3:
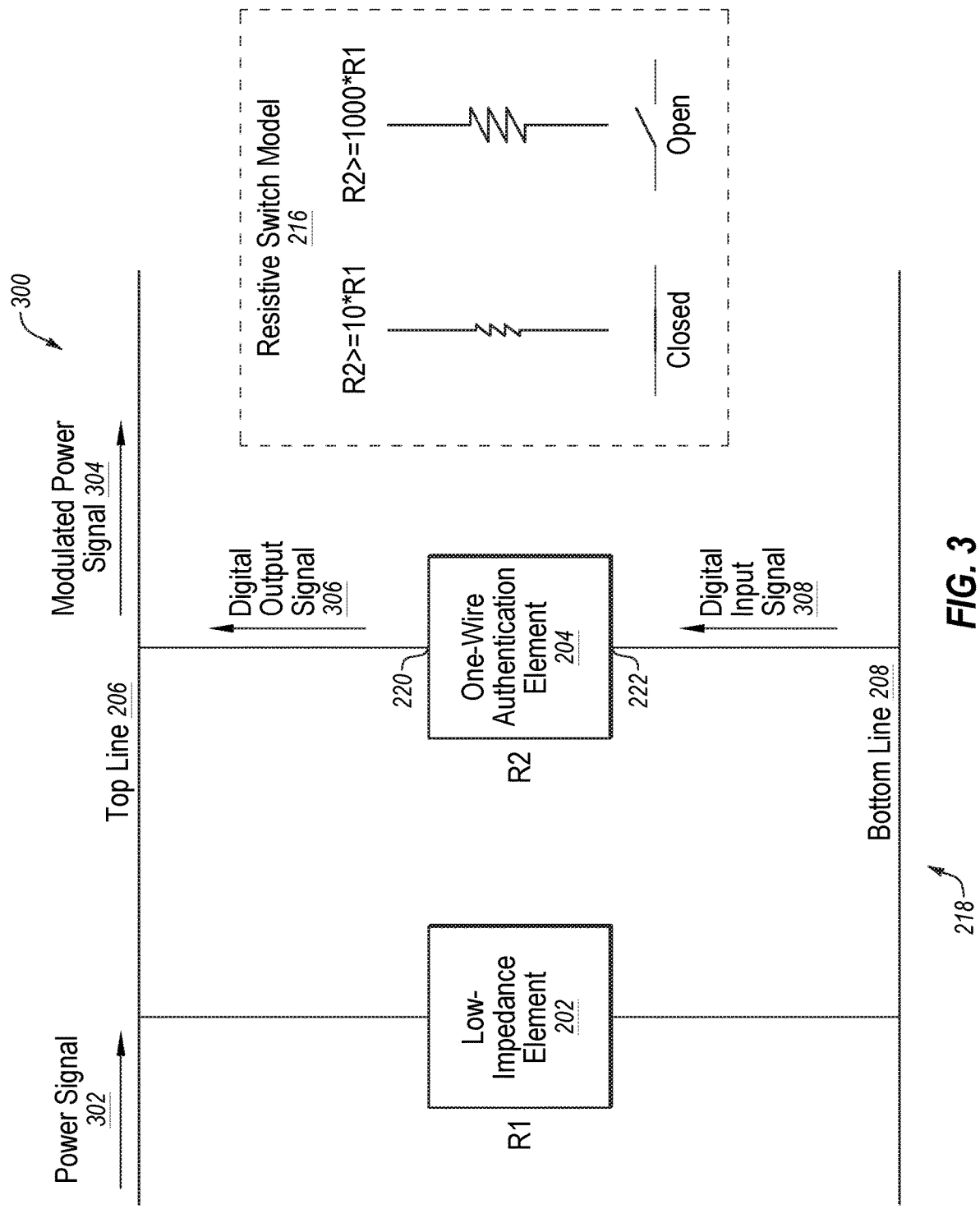
FIG. 3 illustrates a functional block diagram of a replaceable module in accordance with one or more embodiments and illustrates a conceptual transmission of signals at the replaceable module.

A specific non-limiting example of a resistive switch model is depicted by FIG. 2 and FIG. 3 as resistive switch model 216. When the switch is closed the resistance R2 of the one-wire authentication element 204 is about 10 times R1 (R1 being the impedance of low-impedance element 202). When the switch is open the resistance R2 of the one-wire authentication element 204 is 1000 times or more R1.

In replaceable module 200, one-wire authentication element 204 has an impedance that is much greater than the impedance of low-impedance element 202 (even when one-wire authentication element 204 allows the flow of the maximum amount of third current 214 to flow between input/output pin 220 and ground pin 222) (e.g., by being in a low-impedance mode of operation). In the specific non-limiting examples depicted by FIGS. 2 and 3, one-wire authentication element 204 has an impedance that is ten times greater than that of low-impedance element 202. When one-wire authentication element 204 does not allow the flow of a maximum amount of third current 214, (e.g., by being in a high-impedance mode of operation) the impedance of one-wire authentication element 204 is greater than when it is in the low-impedance mode, 1000 times or more in the specific non-limiting example depicted by FIG. 2.

Because low-impedance element 202 is in parallel with one-wire authentication element 204, and one-wire authentication element 204 has an impedance greater than the impedance of low-impedance element 202, first current 210 (and second current 212) may be close to the same magnitude regardless of whether one-wire authentication element 204 is in a low-impedance mode of operation (e.g., allowing the maximum amount of third current 214 to flow) or a high-impedance mode of operation (e.g., restricting the flow of the third current 214).

As a non-limiting example, consider a case where: top line 206 is kept at a voltage 3 Volts above bottom line 208 (e.g., by power source 102 of FIG. 1, without limitation); low-impedance element 202 has an impedance of 1 Ohm (i.e., R1=1 ohm); one-wire authentication element 204, while in a low-impedance mode of operation, has an impedance of 100 Ohms (i.e., R2=100 Ohms); and one-wire authentication element 204, in a high-impedance mode of operation, has an impedance of 10 kiloOhms (i.e., R2=10,000 ohms). Thus, when one-wire authentication element 204 is in the high-impedance mode, parallel circuit 218 will have a net impedance of 0.9999 Ohms, resulting in first current 210 of 3.0003 Amps, second current 212 of 3.0 Amps, and third current 214 of 0.3 milliAmps. When one-wire authentication element 204 is in the low-impedance mode, parallel circuit 218 will have a net impedance of about 0.99 Ohms, resulting in a first current 210 of 3.030 Amps, a second current 212 of about 3 Amps, and a third current 214 of about 30 milliAmps.

Thus, in some cases it may be difficult or impossible for another device to detect and/or interpret an output signal of one-wire authentication element 204 because the output signal may modulate the current and/or voltage of system 100 by only a small percentage of its total magnitude (e.g., 1% or less, without limitation), and the change may be below a threshold for detecting a signal. System 100 of FIG. 1, as a whole, may be configured to allow a one-wire authentication in parallel with a low impedance element (such as the circuit depicted in FIG. 2 and FIG. 3) to communicate with an external device despite the relatively small difference in the current and/or voltage caused by operation of one-wire authentication element 204.

FIG. 3 illustrates a functional block diagram of a replaceable module 300 in accordance with one or more embodiments. FIG. 3 illustrates a conceptual transmission of signals at replaceable module 200 of FIG. 2. The replaceable module 200 includes low-impedance element 202, one-wire authentication element 204, top line 206, bottom line 208, resistive switch model 216, input/output pin 220, and ground pin 222.

Power signal 302 may represent input power (e.g., DC voltage, without limitation) supplied by a power source with non-zero output impedance (e.g., power source 102 of FIG. 1, without limitation). Digital output signal 306 may represent a digital signal generated by operation of one-wire authentication element 204 (e.g., an alteration in current and/or voltage resulting from one-wire authentication element 204 altering the flow of current, without limitation).

Although depicted as flowing to the right, out of the replaceable module 200, modulated power signal 304 may represent power signal 302 as modified by digital output signal 306. Modulated power signal 304 may represent a change in the voltage at top line 206 or a change in voltage or current at some other point that is altered by operation of one-wire authentication element 204.

Power signal 302 (the voltage supplied by power source 102) may be large relative to digital output signal 306 (the magnitude of the voltage and/or current alterations resulting from operation of one-wire authentication element 204). Thus, modulated power signal 304 may include power signal 302 (power from power source 102) and digital output signal 306. Digital output signal 306 may be difficult to detect and/or interpret in modulated power signal 304.

Digital input signal 308 may represent a digital signal to be used as an input by one-wire authentication element 204. Digital input signal 308 may be generated by changing a voltage at bottom line 208 e.g., by opening a circuit, without limitation. As a non-limiting example, returning again to FIG. 1, authentication unit 110 may be configured to open a switch of power switching 104 which may prevent all current from flowing in replaceable module 200. The opening and closing of the switch may be interpreted by one-wire authentication element 204 as digital input signal 308.

FIG. 4 illustrates a functional block diagram of signal-conditioning flow 400 in accordance with one or more embodiments, which may be performed by signal-conditioning unit 108 of FIG. 1. Signal-conditioning flow 400 may include offset-removing block 402, filtering block 404, amplifying block 406, and waveform-shaping block 408. Although depicted in a specific order, one of ordinary skill in the art would understand that functional blocks of signal-conditioning flow 400 may occur in any order. Additionally, although illustrated as single blocks, there may be multiple instances of any of the blocks of signal-conditioning flow 400 and multiple instances may be arranged in any order, and some functional blocks may be accomplished in fewer functional blocks than those depicted. Indeed, functional blocks may be added and removed from signal-conditioning flow 400 without departing from the generality of this description. As a non-limiting example, signal-conditioning flow 400 may include offset-removing block 402 followed by first filtering block 404, followed by first amplifying block 406, followed by second filtering block 404, followed by second amplifying block 406, followed by waveform-shaping block 408. Additionally or alternatively, one of more of the blocks may occur simultaneously and/or at the same location and/or by operation of the same element.

At offset-removing block 402, a signal (e.g., modulated power signal 304 of FIG. 3, without limitation) may be altered by the removal of an offset. As a non-limiting example, when the modulated power signal is characterized by a 3 Amp current (e.g., power signal 302 of FIG. 3) modulated by a 30 milliAmp current (e.g., digital output signal 306 of FIG. 3), offset-removing block 402 may offset the modulated power signal. As another non-limiting example, offset-removing block 402 may measure a current change resulting from operation of one-wire authentication element 204 (which may include a signal generated by one-wire authentication element 204) rather than a current through any particular portion of system 100. For the purposes of describing signal-conditioning flow 400, offset-removing block 402 may receive a modulated power signal and output a leveled signal in response to the modulated power signal.

At filtering block 404, the leveled signal may be filtered to remove noise (e.g., clock noise, without limitation). The filtration at filtering block 404 may be accomplished using any suitable means, including, as non-limiting examples: passive filters, inverters, and/or amplifiers. For the purposes of describing signal-conditioning flow 400, filtering block 404 may output a filtered signal in response to the leveled signal.

At amplifying block 406, the filtered signal, may be amplified. The amplification at amplifying block 406 may be accomplished using any suitable electronic component for amplifying signals known to those of ordinary skill in the art, including, without limitation: an operational amplifier or an inverter. For the purposes of describing signal-conditioning flow 400, amplifying block 406 may output an amplified signal in response to the filtered signal.

At waveform-shaping block 408, the amplified signal may be shaped to more closely resemble a digital signal. The shaping may be accomplished using any suitable means, including, as a non-limiting example: an analog comparator. For the purposes of describing signal-conditioning flow 400, waveform-shaping block 408 may output a digital signal in response to the amplified signal of amplifying block 406.

Referring again to FIG. 1, the digital signal of signal-conditioning flow 400, output by signal-conditioning unit 108, may be configured to be received and interpreted by authentication unit 110. Thus, signal-conditioning flow 400 may be configured to provide a digital signal having voltages and/or timing characteristics that satisfy input requirements of authentication unit 110.

Figure 5:
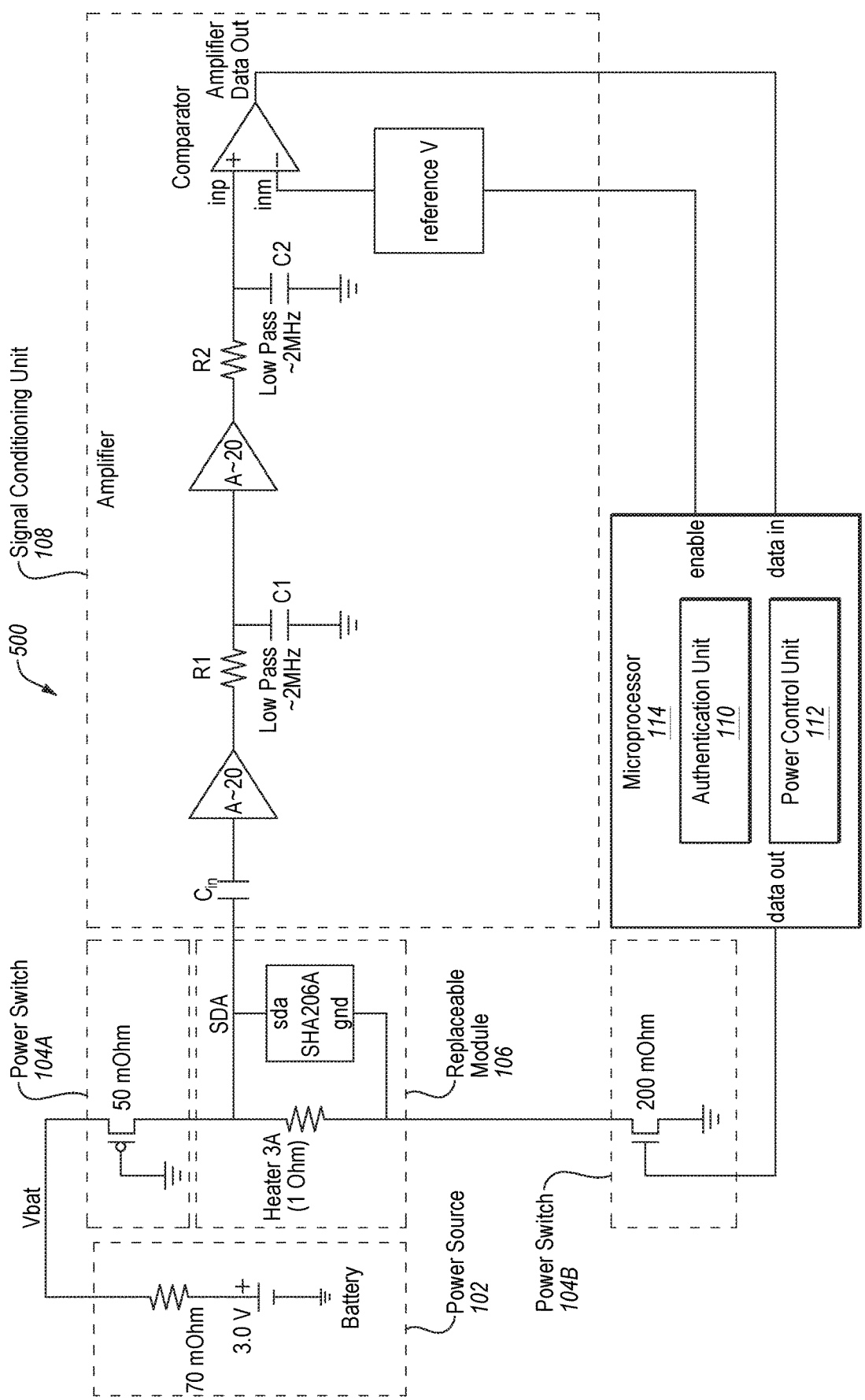
FIG. 5 illustrates a circuit in accordance with one or more embodiments.

FIG. 5 illustrates a schematic diagram of a circuit 500 including a replaceable module 106 interfacing with an authentication unit 110, in accordance with one or more embodiments. As depicted in FIG. 5, circuit 500 may include power source 102, power switch 104A, power switch 104B, replaceable module 106, signal-conditioning unit 108, authentication unit 110, power control unit 112, and microprocessor 114.

Power source 102 may be configured to provide power to the rest of circuit 500. As depicted in FIG. 5, power source 102 includes a 3 Volt battery with an internal impedance of 70 milliOhms.

In the specific example embodiment depicted in FIG. 5, power switch 104A and power switch 104B may be configured to alternately connect (i.e., electrically couple) power source 102 to the rest of circuit 500 and to disconnect power source 102 from the rest of circuit 500. Power switch 104A may be controlled by a user e.g., by a switch or button, without limitation. Power switch 104A may include a transistor with an impedance of much less than 1 Ohm, e.g., without limitation, illustrated here as having an on impedance of 50 milliohm.

In other embodiments, there may be additional power switches (e.g., as described relative to power switching 104 of FIG. 1) that may be configured to electrically connect power source 102 to other circuit elements (e.g., independent of the connection between power source 102 and replaceable module 106). As specific examples, there may be electrical connections (which may include switches) between power source 102 and signal-conditioning unit 108, and/or microprocessor 114. Thus, in some embodiments, signal-conditioning unit 108 may be powered independent of replaceable module 106. This may allow signal-conditioning unit 108 to be switched off during periods of time when replaceable module 106 is not attempting to communicate with authentication unit 110. Additionally or alternatively, microprocessor 114 may be powered independent of replaceable module 106. This may allow authentication unit 110 to power up and communicate an authentication challenge even if, replaceable module 106 is not receiving power e.g., as a result of an external on/off switch turning power to replaceable module 106 off.

In the specific example embodiment depicted in FIG. 5, power switch 104B may be configured to allow current to flow or prevent current from flowing through replaceable module 106 by opening and closing. Power switch 104B may include a transistor. The gate of the transistor may be connected to a pin of the microprocessor (which may be configured to implement power control unit 112) such that the power control unit 112 may be configured to control power switch 104B. Power switch 104B may have an internal impedance much lower than the impedance of the low-impedance element, as a non-limiting example, power switch 104B may have an internal impedance of 200 milliOhms.

Replaceable module 106 may be configured to provide an authentication response in response to an authentication challenge. Replaceable module 106 may include a one-wire authentication element, such as an SHA206A available from Microchip Technology Inc. Additionally, replaceable module 106 may be configured to perform another function (e.g., heating, sensing, or lighting, without limitation). Replaceable module 106 may include a low-impedance element, e.g., a 1 Ohm resistive element, without limitation, acting as a heater, which is rated with the power source 102 to handle 3A of current. As non-limiting examples the low-impedance element may include heating element, a sensing element, and/or a lighting element. The low-impedance element may be arranged in parallel with the one-wire authentication element as illustrated in FIG. 5. As a non-limiting example, the replaceable module 106 may be configured as replaceable module 200 as described with regard to FIGS. 2 and 3.

Signal-conditioning unit 108 may be configured to receive a signal from replaceable module 106 and condition it for reception by authentication unit 110. As a non-limiting example, signal-conditioning unit 108 may be configured to perform one or more of the operations described with regard to signal-conditioning flow 400 of FIG. 4.

Signal-conditioning unit 108 may include one or more elements for removing an offset from a modulated power signal. As a non-limiting example, signal-conditioning unit 108 may include a capacitor and/or input pins of an amplifier. The capacitor and/or the input pins of the amplifier may operate to remove the offset of the modulated power signal such that the signal amplified by the amplifier is the leveled signal (without the DC offset of power source 102).

Signal-conditioning unit 108 may include one or more elements for amplifying the leveled signal. As a non-limiting example, signal-conditioning unit 108 may include a first amplifier that may amplify the leveled signal by 20 times to provide an amplified signal.

Signal-conditioning unit 108 may include one or more elements for filtering the amplified signal. As a non-limiting example, signal-conditioning unit 108 may include a first low-pass filter including a resistive element and a capacitive element tied to ground. The first low-pass filter may be configured to remove noise (including clock noise) from the amplified signal to provide a filtered signal. In one embodiment the first low-pass filter is 2 MHz low-pass filter.

Optionally, signal-conditioning unit 108 may include a second amplifier for further amplifying the filtered signal. The second amplifier may amplify the leveled signal by 20 times. Also, optionally, signal-conditioning unit 108 may include a second low-pass filter for further removing noise from the amplified signal. In one embodiment the second low-pass filter is 2 MHz low pass filter.

Signal-conditioning unit 108 may include one or more elements for shaping the filtered signal and/or amplified signal. As a non-limiting example, signal-conditioning unit 108 may include a comparator for shaping an analog signal (e.g., the filtered signal and/or the amplified signal, without limitation) to more closely resemble a digital signal. The comparator may receive the filtered signal and/or the amplified signal as an input, and compare it to a reference voltage. The comparator may then output the digital signal which may be based on whether the amplified/filtered signal is greater than the reference voltage. As a non-limiting example, the digital signal may be characterized by a first predetermined voltage level (e.g., 2.8 volts, which may be interpreted as "high" or logical "1," without limitation) when the amplified/filtered signal is greater than the reference voltage and the digital signal may be a second predetermined voltage level (e.g., 0.2 volts, which may be interpreted as "low" or logical "0," without limitation) when the amplified/filtered signal is less than the reference voltage.

The specific embodiment of FIG. 5 includes microprocessor 114 which may be configured to implement authentication unit 110 and/or power control unit 112.

Authentication unit 110 may be configured to authenticate replaceable module 106. Authentication unit 110 may provide an authentication challenge to replaceable module 106 and may receive an authentication response from replaceable module 106 and thereby determine whether to authenticate replaceable module 106. Authentication unit 110 may be and/or include one or more modules and/or circuits configured to perform features and functions of embodiments of authentication unit 110 described herein.

Optionally, power control unit 112 may be configured to provide the reference voltage to the comparator of signal-conditioning unit 108. Optionally, authentication unit 110 or power control unit 112 may be configured to provide a signal to signal-conditioning unit 108 governing when to operate (to receive and condition a signal from replaceable module 106). Optionally, authentication unit 110 may be configured to control (or direct power control unit 112 to control) power switch 104B to regulate replaceable module 106. As a non-limiting example, power control unit 112 may control a temperature of a heating element in replaceable module 106 by controlling current through replaceable module 106 by opening and closing power switch 104B.

As a non-limiting example of a contemplated operation of circuit 500, replaceable module 106 may be inserted into circuit 500 and power switch 104A may be turned "on." Authentication unit 110, receiving power, may power up. When authentication unit 110 powers up, authentication unit 110 may provide an authentication challenge by opening and closing (or directing power control unit 112 to open and close) power switch 104B. A one-wire authentication element (e.g., the one-wire authentication element 204 of FIG. 2) of replaceable module 106 (having also powered up after receiving power) may receive and interpret the authentication challenge based on a voltage change at its input/output pin based on the opening and closing of power switch 104B. The one-wire authentication element 204, having received the authentication challenge, may provide an authentication response. The authentication response may be provided on the input/output pin of the one-wire authentication element. The authentication response may be shunted by the one-wire element. The authentication response may be characterized at this point as a modulated power signal because the authentication response modulates the power signal provided by power source 102.

Because of the shunting effect of the one-wire authentication element 204, signal-conditioning unit 108 may be configured to recover the authentication response. As a non-limiting example, the capacitor and the first amplifier may amplify the alterations in the voltage at the input/output pin, (that may be the result of operation of the one-wire element, i.e., the authentication response) from the modulated power signal (e.g., the modulated power signal 304 of FIG. 3). To do this, the capacitor may remove the DC offset of power source 102 and the first amplifier may amplify the alterations in the voltage of the modulated power signal, with the DC offset removed, to provide the amplified signal. Thereafter, the first low-pass filter may filter noise from the amplified signal and thus provides the filtered signal. Thereafter the second amplifier may further amplify the filtered signal to generate a second amplified signal and the second low-pass filter may filter the second amplified signal to generate a second filtered signal. Thereafter, the comparator may compare the second filtered signal to a reference voltage and provide a digital signal based on the comparison. The digital signal (which may include the authentication response in a recovered and/or amplified format) may then be provided to authentication unit 110 which may authenticate replaceable module 106.

In response to authentication unit 110 receiving a valid authentication response from replaceable module 106, authentication unit 110 may be configured to allow replaceable module 106 to continue to receive power by controlling (or directing power control unit 112 to control) power switch 104B to remain closed. In response to authentication unit 110 not receiving a valid authentication response from replaceable module 106, authentication unit 110 may be configured to prevent replaceable module 106 from receiving power by opening (or directing power control unit 112 to open) power switch 104B.

Figure 6A:
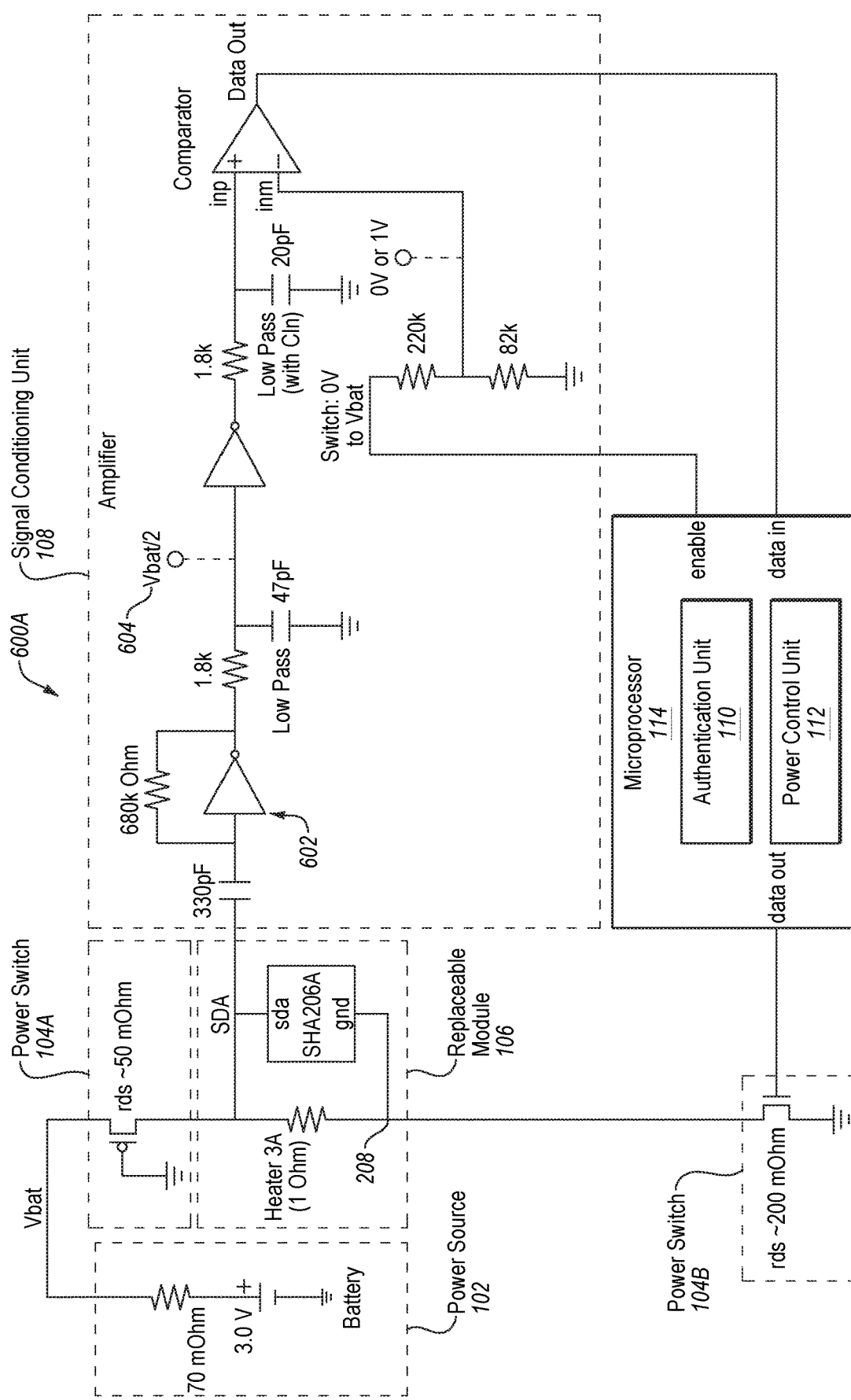
FIG. 6A illustrates a circuit in accordance with one or more embodiments.

FIG. 6A illustrates a schematic diagram of circuit 600A wherein replaceable module 106 interfaces with authentication unit 110 via signal-conditioning unit 108 and power switch 104B, in accordance with one or more embodiments. For simplicity, various elements in circuit 600A of FIG. 6A that are the same as or analogous to elements in circuit 500 of FIG. 5 will not be described with reference to FIG. 6A.

For purposes of description, a reference point at bottom line 208 is provided between the replaceable module 106 and the power switch 104B.

Signal-conditioning unit 108 of circuit 600A may be configured to perform the same operations as signal-conditioning unit 108 in circuit 500 using different elements. As a non-limiting example, signal-conditioning unit 108 of circuit 600A may include a first inverter 602 with its input connected to its output through a resistor with a non-limiting value of 680 kiloOhms of impedance. Additionally, the first inverter may be AC coupled to the modulated power signal through an input capacitor, with a non-limiting value of 300 picofarads. The first inverter may amplify the leveled signal. The leveled signal may then be filtered by a first series resistive element and a first capacitor to ground so as to provide the filtered signal. For purposes of description, a reference point 604 is provided between the first filter (the first series resistive element and first capacitor to ground) and a second inverter. Signal-conditioning unit 108 of circuit 600A may include the second inverter that may amplify the filtered signal followed by a second series resistive element and a second capacitor to ground so as to provide the amplified and filtered signal.

Authentication unit 110 provides a switched voltage to an inverting input of a comparator as a reference voltage, the reference voltage received by the comparator through a voltage divider. In one embodiment, the reference voltage received by the comparator may be either 1 volt, so as to enable the passage of data from the one-wire authentication element 204, or 0 volt so as to set the output of the comparator to a fixed high level. For example, when the digital comparator enable signal is high, the negative comparator voltage (inm) may be around 1V. The digital Data Out signal may be generated as the inp comparator signal crosses the 1V level. And, when the digital comparator enable signal is low, the comparator inm net is at 0V, and the Data Out signal remains fixed (high). In some embodiments, the power to the signal-conditioning unit 108 drawing could be switched off after authentication.

In the specific non-limiting example depicted by FIG. 6A, authentication unit 110 and power control unit 112 are implemented in a microprocessor configured to perform features and functions of authentication unit 110 and power control unit 112 described herein).

Figure 6B:
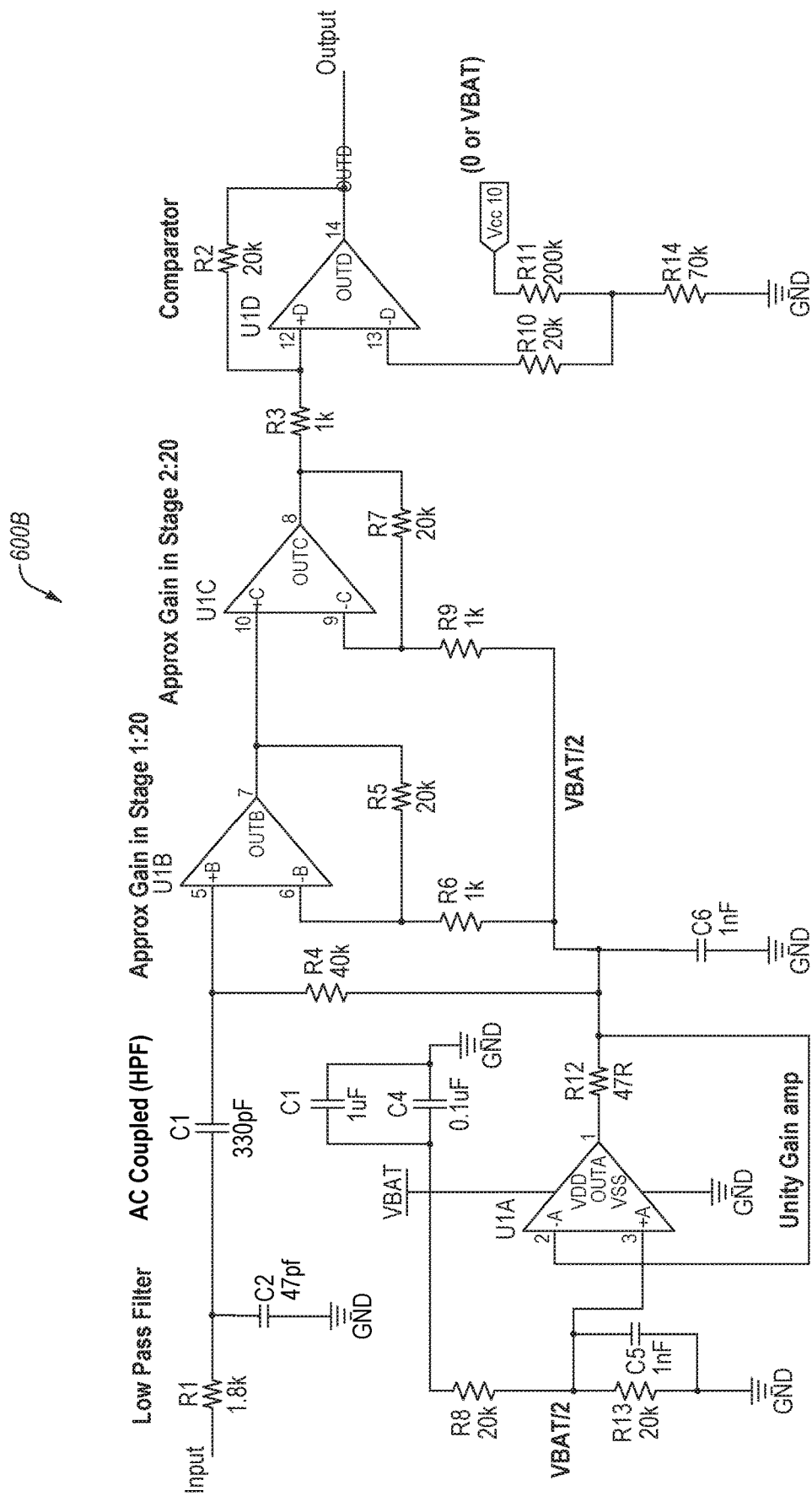
FIG. 6B illustrates a schematic diagram of a circuit according to one or more embodiments.

FIG. 6B illustrates a schematic diagram of a circuit 600B according to one or more embodiments. The circuit 600B is yet another example of an embodiment of the signal-conditioning unit 108 described above with regard to FIGS. 1, 5, and 6A. The circuit 600B includes four operational amplifiers ("op amps") (which may be included on a single IC). The circuit 600B may perform operations the same as or analogous to the operations described above with regard to FIG. 4. The circuit 600B may include a low-pass filter, AC-coupling, two gain stages, and a comparator. One difference between the circuit 600B and the signal-conditioning unit 108 described above with regard to circuit 600A of FIG. 6A, is that circuit 600B uses a unity-gain op amp to produce the leveled signal (e.g., as described above with regard to FIG. 4) whereas the signal-conditioning unit 108 of circuit 600A of FIG. 6A uses an inverter with a 680 kiloOhms of resistor between the input and the output of the inverter. In the specific non-limiting example depicted by FIG. 6, circuit 600B uses a unity gain OpAmp to provide a reference voltage that is used to level shift the input signal to the center of the supply range.

It is to be understood that circuit 500 of FIG. 5, circuit 600A of FIG. 6A, and circuit 600B of FIG. 6B are just three non-limiting examples of circuits that may be embodiments according to the present disclosure. The elements, arrangements, and values provided are non-limiting examples of elements, arrangements, and values for a circuit according to the present disclosure.

Figure 7A:
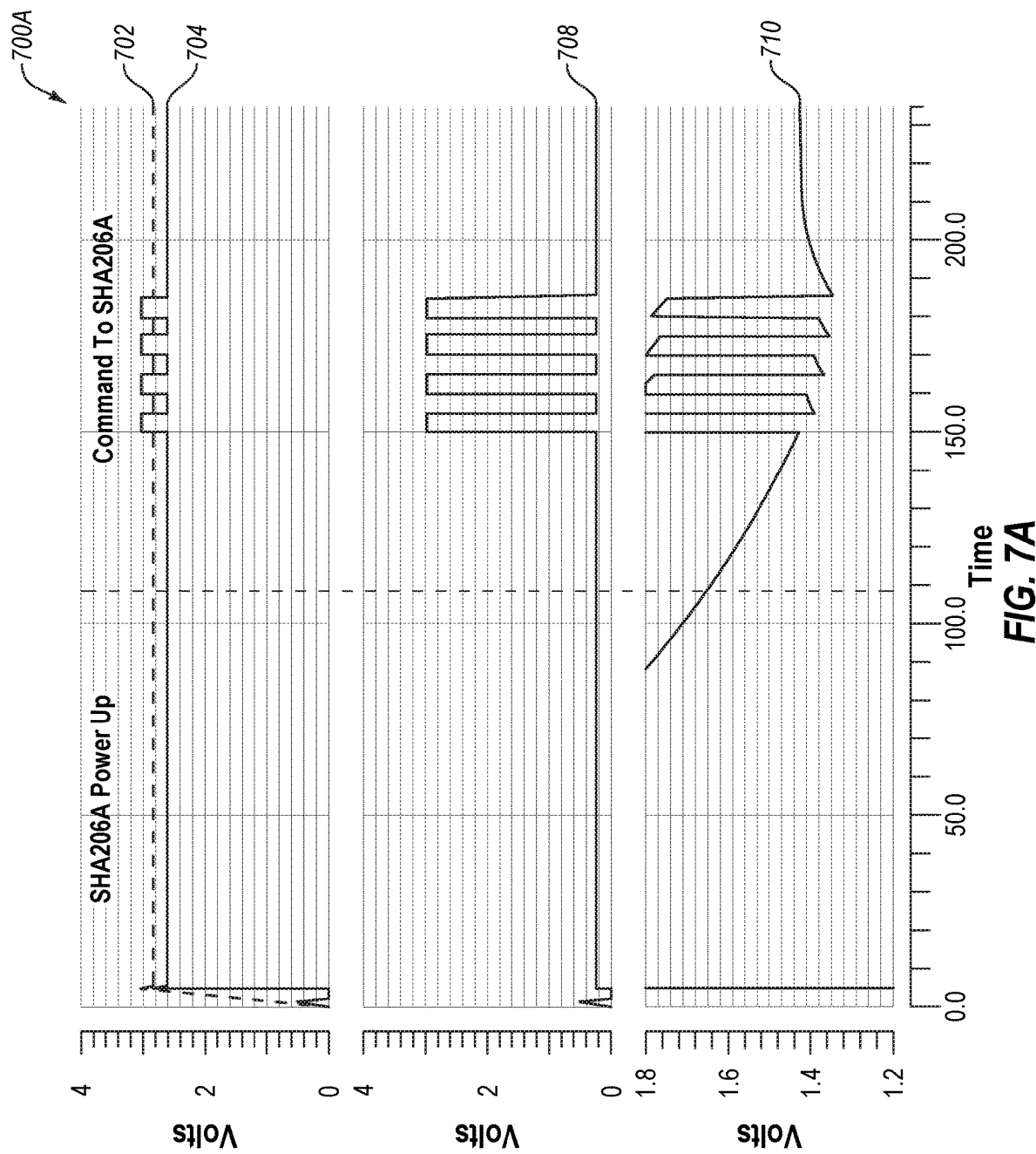
FIGS. 7A and 7B illustrate waveform diagrams associated with an authentication process, in accordance with one or more embodiments.
Figure 7B:
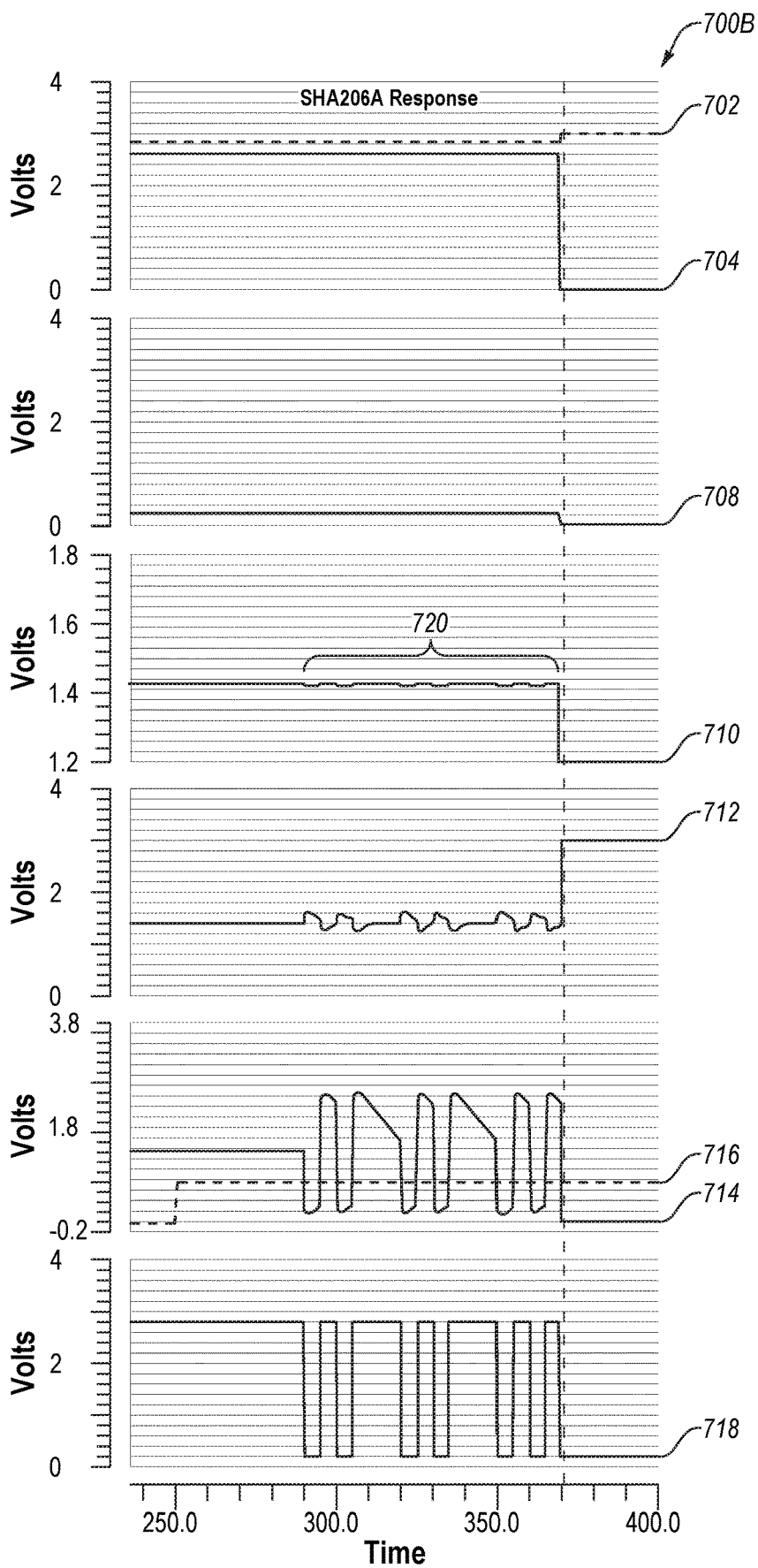

As a non-limiting example, FIG. 7A depicts a waveform diagram 700A during a first phase (SHA206A Power Up) and a second phase (Command to SHA206A) of an authentication process, in accordance with one or more embodiments. Waveform diagram 700A includes simulated voltages at various points in a simulated system or circuit, e.g., circuit 600A of FIG. 6A, without limitation, at various times during an operation of the system. The leftmost phase represents a time period during which system 100 (including replaceable module 106 (including e.g., an IC, without limitation) and authentication unit 110 (which may be implemented by a microprocessor, without limitation)) are powering up. The second phase (from the left) represents a time period during which replaceable module 106 (including the IC) are receiving a command (e.g., an authentication challenge, without limitation) (e.g., from authentication unit 110, without limitation). FIG. 7B depicts a waveform diagram 700B during a third phase (SHA206A Response). The third phase represents a time period during which replaceable module 106 (including the IC) responds (e.g., provides an authentication response to the authentication challenge, without limitation). And, the time period depicted to the right of the third phase in FIG. 7B represents a time period during which signal-conditioning unit 108 may be powered down.

The topmost diagram includes battery voltage 702 which represents a simulated voltage at a point between power source 102 of FIG. 1 and power switch 104A. The topmost diagram also includes I/O pin voltage 704 which represents a simulated voltage at an input/output pin 220 of replaceable module 106 (FIGS. 2 and 3). During the second phase, while replaceable module 106 is receiving a command, it can be seen that the voltage of the I/O pin voltage 704 is altered, corresponding to the command message. Referring to FIG. 1, the voltage at the input of replaceable module 106 may be altered by the opening and closing of power switch 104B and seen as a voltage from input/output pin 220 and ground pin 222.

The second (from the top) diagram depicted by FIG. 7A includes digital input signal 708 which represents a voltage at bottom line 208. During the second phase, it can be seen that the voltage at bottom line 208 goes high when power switch 104B is opened by power control unit 112 e.g., as directed by authentication unit 110 to communicate to replaceable module 106.

The third (from the top) diagram depicted by FIG. 7A includes AC-coupled signal 710 which represents a voltage in a first portion of signal-conditioning unit 108. More specifically, AC-coupled signal 710 may represent a voltage at the input of the first inverter 602 of circuit 600A of FIG. 6A, i.e., following the first capacitor.

Turning to FIG. 7B, FIG. 7B depicts waveform diagram 700B during the third phase (SHA206A Response) of an authentication process that follows the first and second phases depicted by FIG. 7A, according to one or more embodiments.

The first, second, and third diagrams (from the top) include the battery voltage 702, I/O pin voltage 704, digital input signal 708, and AC-coupled signal 710. The fourth (from the top) diagram includes amplified-and-filtered signal 712 which represents a voltage in signal-conditioning unit 108 (e.g., at a point (e.g., reference point 604 of FIG. 6A) following one or more operations (e.g., blocks of signal-conditioning flow 400 e.g., filtering blocks and/or amplifying blocks, without limitation). During the third phase, the changes in voltage on the AC-coupled signal 710 during a time 720 (e.g., resulting from operation of replaceable module 106) are amplified relative to AC-coupled signal 710. The amplified changes in voltage can be seen in the amplified and filtered signal 712 during the corresponding time. Also, in amplified-and-filtered signal 712 it can be seen that the voltage has been inverted (as a result of using an inverter to amplify the voltage).

The fifth (from the top) diagram includes twice-amplified-and-filtered signal 714, which represents a voltage in signal-conditioning unit 108 (e.g., at a point following two or more operations (e.g., blocks of signal-conditioning flow 400) e.g., filtering blocks and/or amplifying blocks, without limitation). During the third phase, the changes in voltage (e.g., resulting from operation of replaceable module 106) are amplified relative to the amplified-and-filtered signal 712. Also, in the twice-amplified-and-filtered signal 714 it can be seen that the voltage has been inverted as compared to AC-coupled amplified-and-filtered signal 712 (as a result of using an inverter to amplify the voltage). Additionally, the fifth diagram includes a reference voltage 716 which may be provided to a comparator as a reference voltage. Notably, as depicted in FIG. 7, reference voltage 716 is only provided after the beginning of the third phase, when a signal is expected from one-wire authentication element 204.

The sixth (and bottommost) diagram includes digital signal 718 which represents a voltage following signal-conditioning unit 108 (at an output of signal-conditioning unit 108 and an input to authentication unit 110). During the third period, the amplified-and-filtered signal of twice-amplified-and-filtered signal 714 has been compared to reference voltage 716 (e.g., by a comparator, without limitation); the result is digital signal 718. As can be seen, digital signal 718 is shaped more like a digital signal than twice-amplified-and-filtered signal 714. Thus, digital signal 718 is more suited for use as an input to an IC, e.g., a microprocessor of authentication unit 110, without limitation. Specifically, digital signal 718 may have been configured to have an amplitude and pulse width that may satisfy input level requirements of the microprocessor of authentication unit 110.

Figure 8:
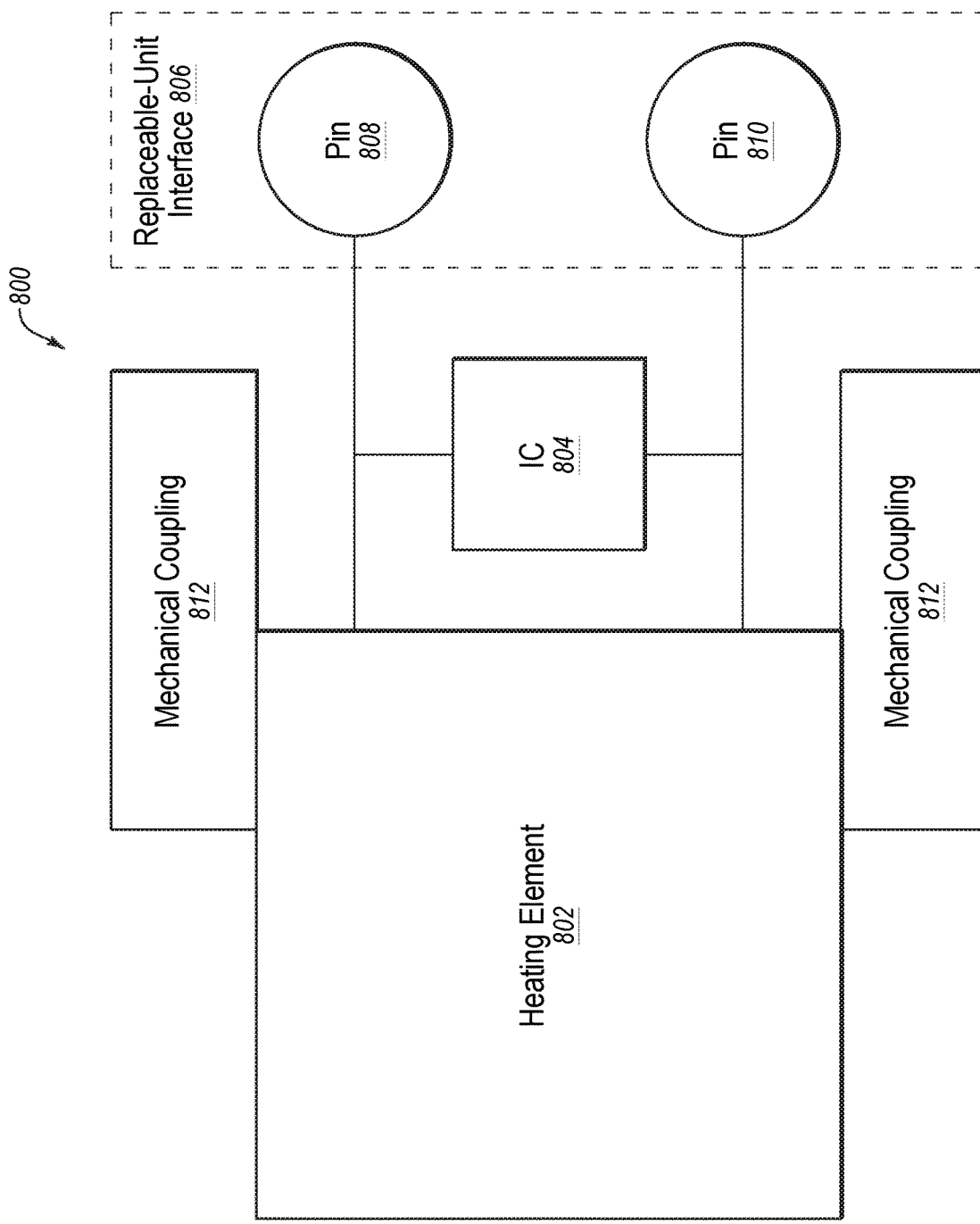
FIG. 8 illustrates a functional block diagram of a replaceable unit in accordance with one or more embodiments.

FIG. 8 illustrates a functional block diagram of replaceable unit 800 in accordance with one or more embodiments. Replaceable unit 800 may include heating element 802, IC 804, mechanical couplings 812, and replaceable-unit interface 806 including first pin 808, second pin 810.

Heating element 802 may be an example of low-impedance element 202 of FIG. 2. Heating element 802 may be configured to heat when power is applied across first pin 808 and second pin 810. Heating element 802 may include a conductive material shaped and arranged to provide heat when current passes through it. Heating element 802 may have low impedance (e.g., less than one hundred Ohms, without limitation).

IC 804 may be an example of one-wire authentication element 204 of FIG. 2. IC 804 may be configured to provide a response to an authentication challenge. IC 804 may be a one-wire element. IC 804 may be configured to receive an input and provide an output based on only an input/output pin and a ground pin.

First pin 808 and second pin 810 may include conductive material configured to be connected to additional electronic contacts. As such, first pin 808 and second pin 810 may be characterized as replaceable-unit interface 806 because first pin 808 and second pin 810 allow for electrical connection to replaceable unit 800. Additionally, replaceable-unit interface 806 may allow for communication with IC 804.

Mechanical couplings 812 includes any suitable means for mechanical coupling of replaceable unit 800 to another device, e.g., a user device, without limitation. As non-limiting examples, mechanical couplings 812 may include clips, tabs, or threads.

Another embodiment may relate, generally, to a system that includes a replaceable module, a user device, an authentication unit, and an interface. The replaceable module may include a catalyzing element; and an authentication element in parallel with the catalyzing element. The catalyzing element may have a lower impedance than an impedance of the authentication element. The impedance of the catalyzing element may be on the order of $\frac{1}{10}$ to $\frac{1}{100}$ of the impedance of the authentication element, without limitation. The authentication element may include a single interface for both communication and power (the authentication element may include a one-wire authentication element). The user device may be configured for operable coupling to the replaceable module. While operably coupled, the replaceable module and the user device may form a system configured to perform a process that would deplete at least a portion of an item disposed within an item region of the user device. The authentication module may be configured to perform a verification process for verifying authenticity of the replaceable module, and to permit operable coupling between the user device and the replaceable module in response to verifying the authenticity of the replaceable module. The interface may be configured to facilitate communication between the authentication module and the authentication element of the replaceable module. The interface may include signal-conditioning circuitry.

Figure 9:
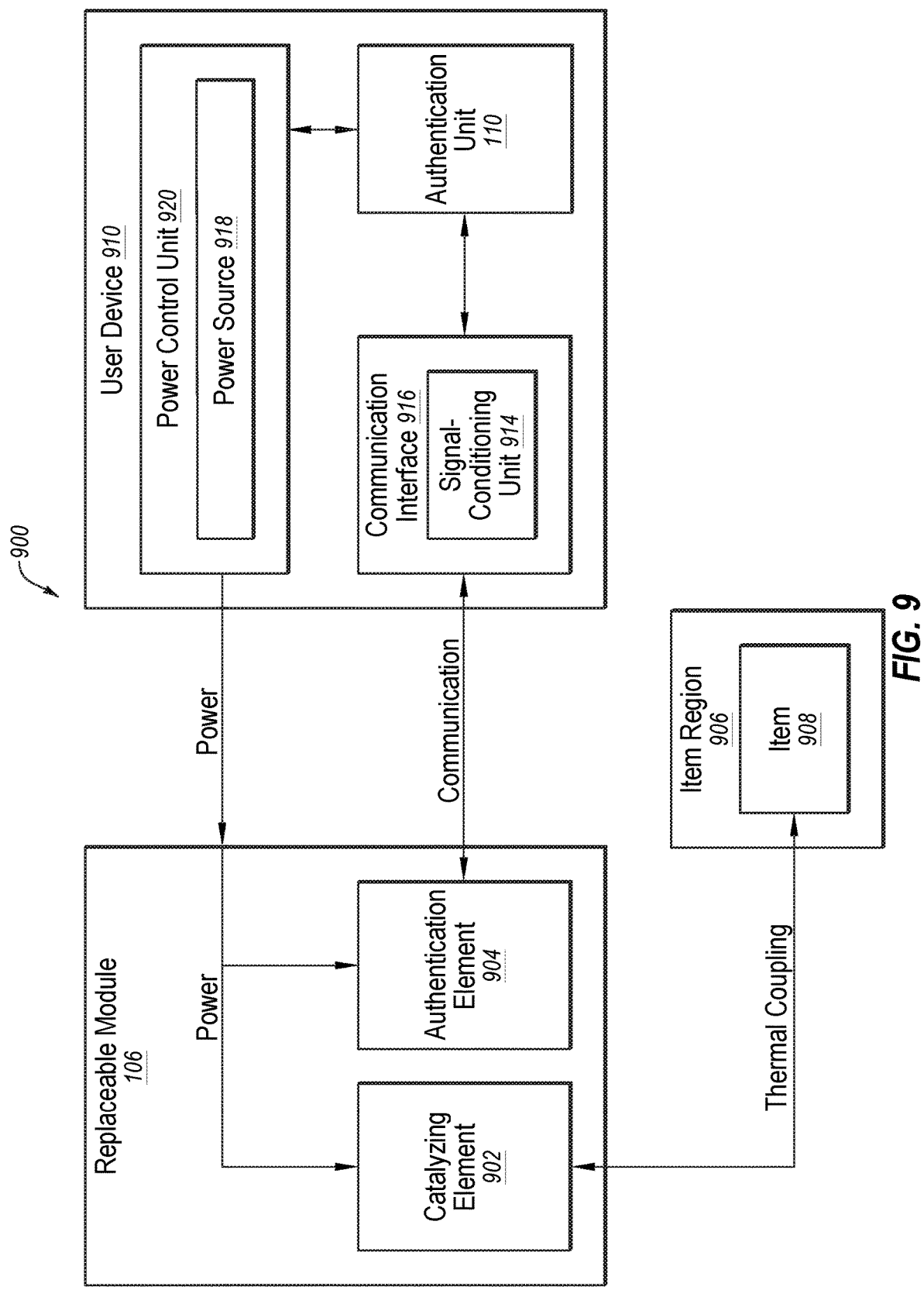
FIG. 9 illustrates a functional block diagram of a system in accordance with or more embodiments.

FIG. 9 illustrates a functional block diagram of system 900 in accordance with one or more embodiments. System 900 may include user device 910 including authentication unit 110 communication interface 916 (including signal-conditioning unit 914), and power control unit 920. System 900 may also include item region 906 (configured to retain item 908). System 900 may also include power source 918. System 900 may also include replaceable module 106 including catalyzing element 902 and authentication element 904. Elements of the system 900, including: user device 910, replaceable module 106, item region 906, may be arranged together in one of several configurations. As a non-limiting example, user device 910 may be configured to retain replaceable module 106. As a non-limiting example, replaceable module 106 may be inserted into user device 910. As two non-limiting examples, the power source 918 may be retained within the user device 910 or within the replaceable module 106 such that connecting the user device 910 with the replaceable module 106 includes electrically connecting the power source 918 to the user device 910 and to the replaceable module 106. Optionally, user device 910 may be configured to retain item region 906 and to facilitate at least a thermal connection/coupling between catalyzing element 902 of replaceable module 106 and item 908 of item region 906 when system 900 is turned on and power is supplied to replaceable module 106. As another non-limiting example, item region 906 may be included in replaceable module 106 such that a connection between user device 910 and replaceable module 106 includes a connection between user device 910 and replaceable module 106 and item region 906. As another non-limiting example, item region 906 may be included in user device 910.

Replaceable module 106 of system 900 may be an example of replaceable module 106 of FIG. 1, and/or of replaceable module 200 of FIGS. 2 and 3. Catalyzing element 902 may be an example of low-impedance element 202 of FIG. 2 and/or FIG. 3. Authentication element 904 may be an example of one-wire authentication element 204 of FIG. 2 and/or FIG. 3.

Authentication unit 110 of user device 910 may be an example of authentication unit 110 of FIG. 1. Authentication unit 110 may be configured to authenticate replaceable module 106 by communicating an authentication challenge to authentication element 904 and receiving an authentication response from authentication element 904. Authentication unit 110 may be configured to communicate to and from replaceable module 106 through communication interface 916. Communication interface 916 may include signal-conditioning unit 914, which may be an example of signal-conditioning unit 108 of FIG. 1. Additionally or alternatively, communication interface 916 may include a switch (e.g., a ground switch as a non-limiting example, power switch 104B of FIG. 5) to communicate messages to replaceable module 106. Power control unit 920 of user device 910 may be an example of authentication unit 110 of FIG. 1. Power control unit 920 may be configured to regulate power to the various element of system 900 including communication interface 916, authentication unit 110, and replaceable module 106. In some embodiments, power control unit 920 may cooperate with and/or be directed by authentication unit 110 in the regulation of power. For example, authentication unit 110 may direct power control unit 920 to allow or prevent power from flowing to replaceable module 106 in response to a verification process carried out by authentication unit 110. Additionally or alternatively, system 100 may direct power control unit 920 to send an authentication challenge to replaceable module 106 by regulating power provided to replaceable module 106.

Item region 906 may include a receptacle for item 908. Item 908 may include any suitable item including, as non-limiting examples: e.g., vape juice, E-liquid or tobacco, without limitation. Item 908 may be consumable, e.g., by being vaporized by catalyzing element 902, without limitation. Item region 906 may be part of or incorporated into user device 910 and/or item region 906 may be replaceable and may be connected to user device 910. Item region 906 may be configured to facilitate a thermal connection between catalyzing element 902 of replaceable module 106 and item 908.

The lines depicted between the various elements of system 900 may represent one or more of physical connections, electrical connections, logical connections, and/or communicative connections, without limitation. Lines annotated with words and arrows depict certain aspects of the connections. As a specific example, the line between the power source 918 and the replaceable module 106 indicates that the power source 918 provides power to the replaceable module 106. As described above, the provision of power to the replaceable module 106 by the power source 918 may be controlled to control or regulate the replaceable module 106 and/or to communicate with the replaceable module 106. The line between the communication interface 916 and the authentication element 904 may indicate a communicative connection, e.g., the communication interface 916 may facilitate communication between the authentication element 904 and the authentication unit 110. The line between the user device 910 and the replaceable module 106, the line between the replaceable module 106 and the item region 906, and the line between the user device 910 and the replaceable module 106 may represent physical connections between the user device 910, the replaceable module 106, and the item region 906, which may, as described above, come in a variety of configurations. The line between the catalyzing element 902 and the item 908 may illustrate a thermal connection between the catalyzing element 902 and the item 908. Through the thermal connection, the item 908 or a portion of the item 908 may be heated, vaporized, catalyzed, and/or depleted.

Figure 10:
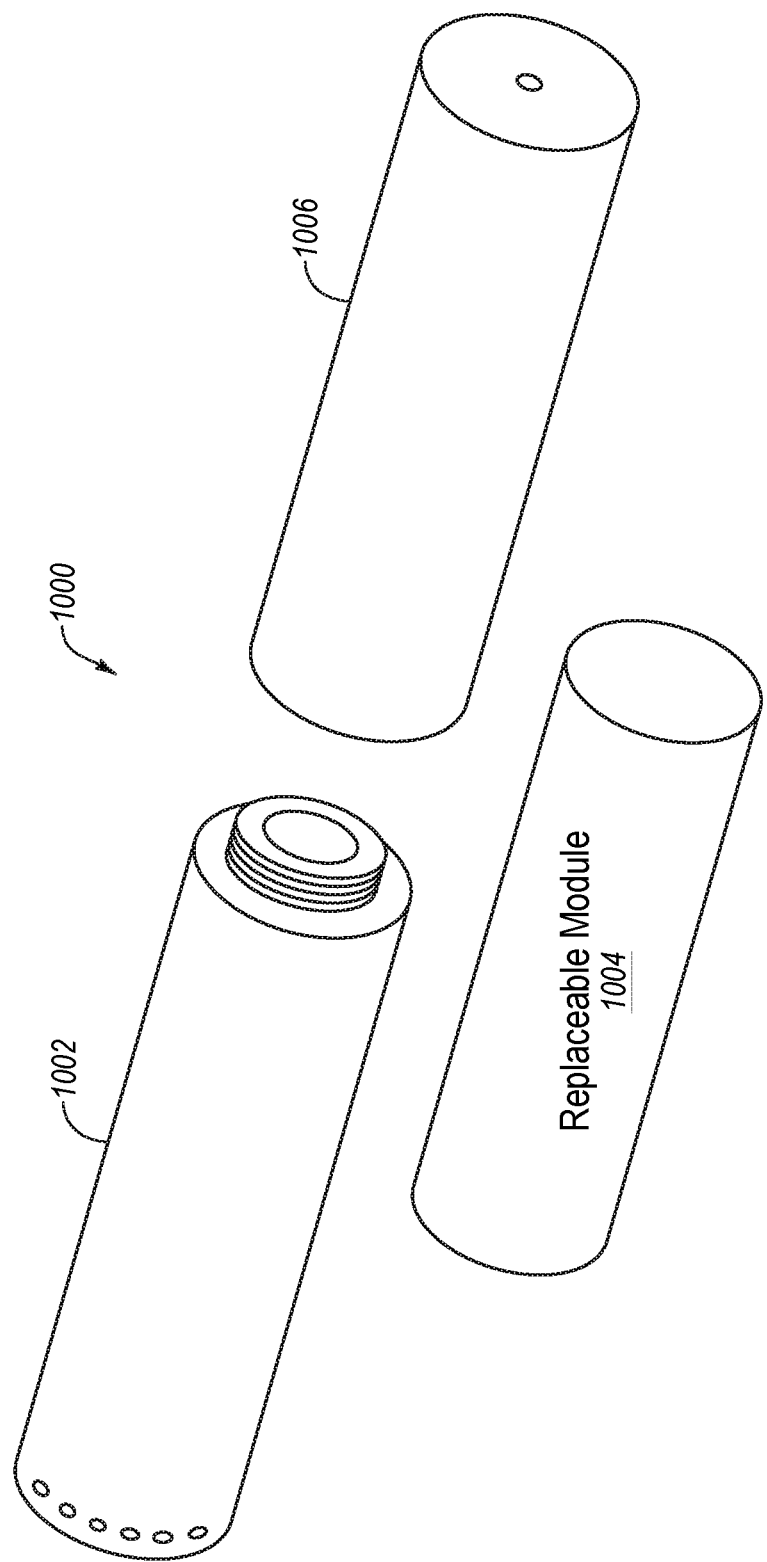
FIG. 10 illustrates a system in accordance with one or more embodiments.

FIG. 10 illustrates a functional block diagram of system 1000 in accordance with one or more embodiments. As an example of an instance in which embodiments of the present disclosure may be used, system 100 of FIG. 1 may be used in an electronic aerosol device, e.g., system 1000 of FIG. 10, without limitation. System 1000 includes user device 1002 (which may include a battery unit of an electronic aerosol device), replaceable module 1004 (which may include a heating element of an electronic aerosol device), and item region 1006 (which may include a cartridge for an electronic aerosol device).

User device 1002 may include a battery that may be an example of power source 102 of FIG. 1. User device 1002 may include an on/off switch or button (not shown) that may be an example of power switching 104 of FIG. 1. User device 1002 may include a microprocessor (not shown) which may implement authentication unit 110 and/or power control unit 112 of FIG. 1. The microprocessor may be configured to (among other things) authenticate replaceable module 1004 and/or control power distribution through user device 1002. User device 1002 may include a pulse-width modulated (PWM) switch (not shown) that may be an example of a switch of power switching 104 of FIG. 1. User device 1002 may include a circuit between positive and negative terminals of the battery. Thus, user device 1002 may include a circuit ground. The PWM switch of user device 1002 may be used to control power used by the heating element of the electronic aerosol device and thereby control temperature of a heating element.

Replaceable module 1004 may include a heating element. The heating element may be an example of the low-impedance element 202 of FIG. 2. Replaceable module 1004 may be configured to be replaceable because the heating element may be configured to heat to high temperatures, (e.g., 100 to 500 degrees Celsius, without limitation) which may cause degradation over time. Additionally, the heating element may be in contact with a consumable product found in item region 1006 (e.g., vape juice, E-liquid or tobacco, without limitation) which may cause degraded performance of the heating element over time. Thus, replaceable module 1004 may be configured to be replaceable within system 1000.

Replaceable module 1004 may include an IC, (e.g., a cryptographic authentication IC, without limitation). The IC may be an example of one-wire authentication element 204 of FIG. 2. The IC may be configured to provide an authentication response to authenticate replaceable module 1004 (in response to an authentication challenge from user device 1002).

Replaceable module 1004 is illustrated as cylindrical for simplicity sake. Replaceable module 1004 may be any suitable shape and may be inserted into either user device 1002 or replaceable module 1004. Replaceable module 1004 may be inserted into both of or between both of user device 1002 and replaceable module 1004.

Item region 1006 may include a region for holding a consumable item (e.g., vape juice, E-liquid or tobacco, without limitation). Item region 1006 may be configured to allow the heating element of replaceable module 1004 to contact the item and/or to heat the item. The item may be consumable, by being vaporized by the heating element.

As a non-limiting example of a contemplated operation of system 1000, replaceable module 1004 (including a heating element and a one-wire authentication element) may be connected to user device 1002 (including a battery unit) of an electronic aerosol device. As a non-limiting example, replaceable module 1004 may be inserted into user device 1002. Item region 1006 may be attached to user device 1002. The electronic aerosol device may be activated (e.g., by an external button or switch, without limitation). As power is applied to the heating element, and the heating element is heating, the microprocessor (of user device 1002) may send, through the PWM switch, an authentication challenge to replaceable module 1004. The authentication challenge may be communicated by opening and closing the PWM switch. The IC of replaceable module 1004, without the need of switching and while power is supplied to the heating element, may be configured to respond to the authentication challenge (e.g., by altering current flow through the input/output pin of the IC, without limitation).

User device 1002 may include signal-conditioning circuitry (which may be an example of signal-conditioning unit 108 of FIG. 1), which may include one or more elements configured to condition a mixed signal including power from the battery and a data signal from the one-wire device. The signal-conditioning circuitry may be configured to offset, filter, amplify, and/or shape the mixed signal. The signal-conditioning circuitry may recover and amplify the data signal and provide the recovered and amplified data signal to the microprocessor.

The microprocessor may be configured to determine whether the response is valid and thereby determine whether the IC (and by extension, replaceable module 1004) is valid. In response to a determination that replaceable module 1004 is valid, the microprocessor may allow continued operation of the electronic aerosol device. In response to a determination that the one-wire device (and by extension, replaceable module 1004) is not valid, the microprocessor may prevent further operation of the electronic aerosol device, as a non-limiting example, by opening a circuit, e.g., by controlling a ground switch, without limitation.

Figure 11:
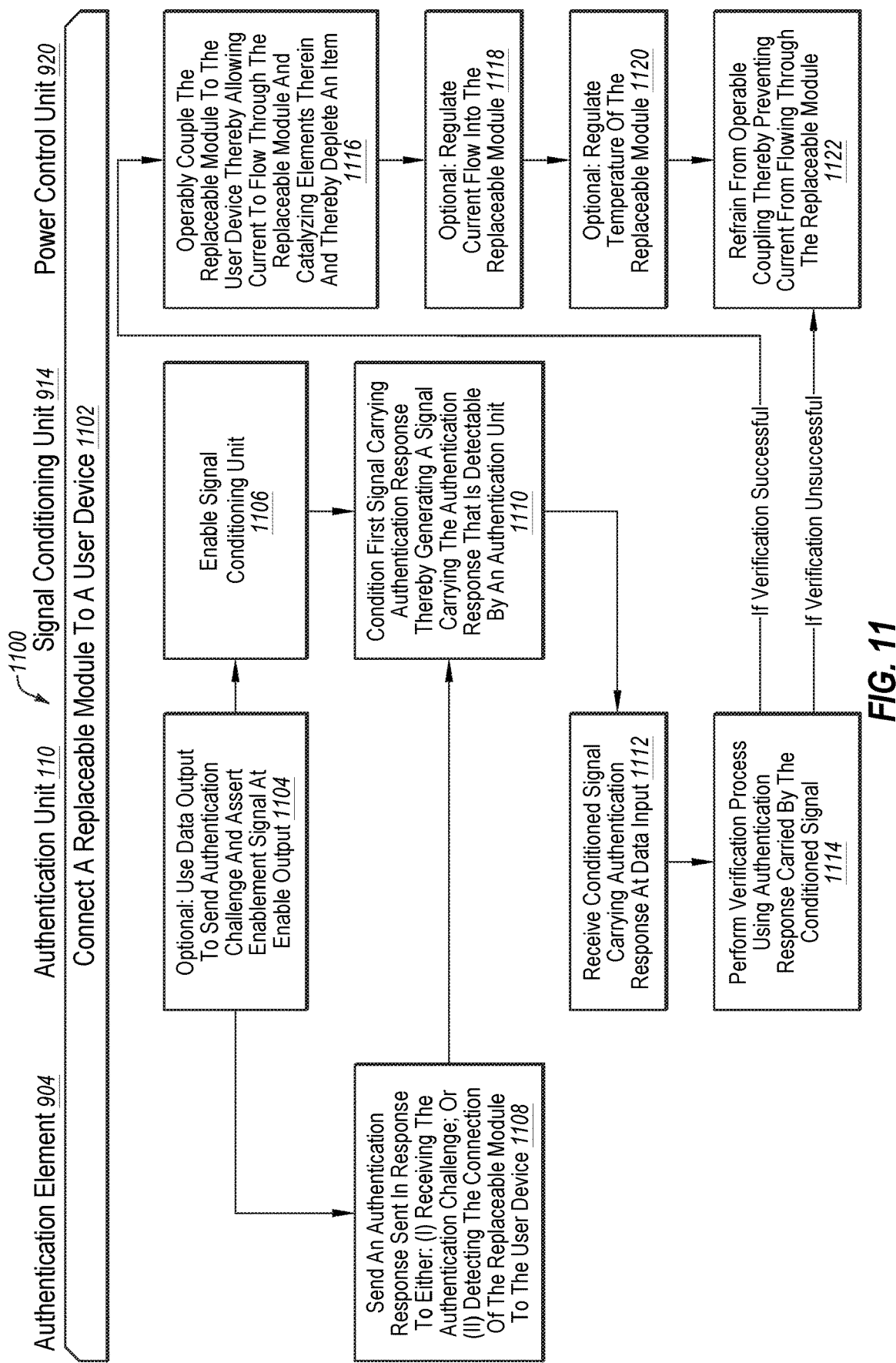
FIG. 11 illustrates a flowchart of an authentication flow in accordance with one or more embodiments.

FIG. 11 depicts a flowchart of a process 1100 for authenticating a replaceable module attempting to operably couple with a user device, according to one or more embodiments. The non-limiting specific example process depicted by FIG. 11 is performed by components of system 900, and specifically, by authentication element 904, authentication unit 110, signal-conditioning unit 914, and user device 910 (and more specifically, power control unit 920 of user device 910).

At operation 1102, process 1100 connects a replaceable module to a user device.

At optional operation 1104, process 1100 optionally sends an authentication challenge to the replaceable module via the data output of the authentication unit 110, which as indicated above may be implemented by a microprocessor, and the data output may be a respective general purpose output port thereof. Additionally or alternatively, an enable signal is asserted at the enable output of the authentication unit 110. The enable output may be a respective general purpose output port of authentication unit 110 and, more generally, a microprocessor implementing the same. An authentication challenge may be sent responsive to detecting the connection in operation 1102. In another embodiment, an authentication challenge may be sent, and an enable signal asserted, in response to a user device being "powered on"

while there is a replaceable module connected to it. In some embodiments, an authentication challenge may be sent, and an enable signal asserted, after a duration of time during which an authentication unit is powering on.

In some embodiments not illustrated in FIG. 11, at optional operation 1104, the authentication unit 110 may direct power control unit 920 to provide the authentication challenge to the authentication element 904 and the power control unit 920 may be configured to provide the authentication challenge by adjusting power to the authentication element 904.

Optional operation 1104 is optional because in some embodiments an authentication element (e.g., a one-wire authentication element 204, or authentication element 904, without limitation) may be configured to send an authentication response without having received a challenge (e.g., send an authentication response of operation 1108). An authentication unit may be configured to receive and verify the authentication response despite not having sent an authentication challenge. Furthermore, the enable signal may be fixed as asserted without exceeding the scope. In some embodiments, only one of assertion of the enable signal and sending of the authentication challenge is performed by optional operation 1104.

At operation 1108, process 1100 sends an authentication response in response to either (i) receiving the authentication challenge of optional operation 1104, or (ii) detecting the connection of the replaceable module to the user device in operation 1102. The authentic response of operation 1108 is sent by the authentication element 904.

At operation 1110, process 1100 conditions the signal carrying the authentication response sent in operation 1106 thereby generating a signal to carry the authentication response that is detectable by an authentication unit (e.g., a digital signal output from waveform-shaping block 408 of signal-conditioning flow 400 depicted by FIG. 4), which may be implemented by signal-conditioning unit 914.

At operation 1112, process 1100 receives the conditioned signal carrying the authentication response of operation 1110 at a data input port of authentication unit 110, which may be implemented by a respective general purpose input port of authentication unit 110 and more generally of a microprocessor implementing the same.

At operation 1114, process 1100 performs a verification process at authentication unit 110 using the authentication response carried by the signal conditioned in operation 1108.

In particular, at operation 1114, process 1100 determines whether authentication was successful (i.e., the authentication response, authentication element, and/or replaceable module was verified). If verification was not successful (i.e., the authentication response, authentication element, and/or replaceable module was not verified) then in operation 1122, process 1100 refrains from operable coupling the replaceable module to the user device thereby preventing current from flowing through the replaceable module. If verification was successful (i.e., the authentication response, authentication element, and/or replaceable module was verified) then in operation 1116, process 1100 permits operable coupling of the replaceable module and the user device—thereby allowing current (power current) to flow through the replaceable module and any catalyzing elements therein and depletion of the item.

At optional operation 1118, process 1100 may regulate current flow into the replaceable module. Referring to system 100 of FIG. 1 as a non-limiting example, the power control unit 112 (or another module) at the direction of authentication unit 110 may regulate current flow into the replaceable module 106 (e.g., by controlling power switching 104). Regulation of the current in the replaceable module 106 may be based on feedback or input from another source.

At optional operation 1120, process 1100 may regulate temperature of the replaceable module. For example, temperature of a low-impedance element of the replaceable module may be controlled by regulation of current in the replaceable module.

One of ordinary skill in the art will appreciate that a degree of current shunting away from the one-wire device due to an impedance difference between the one-wire device and a lower impedance element will vary based on specific design choice, including without limitation a relative impedance of a chosen one-wire device and a chosen element in parallel with the one wire device. Such choices may also impact a degree of signal conditioning needed. This disclosure is not limited to a specific degree of current shunting, impedance differential and/or signal conditioning, and all such specific variations are understood to be encompassed herein.

Figure 12:
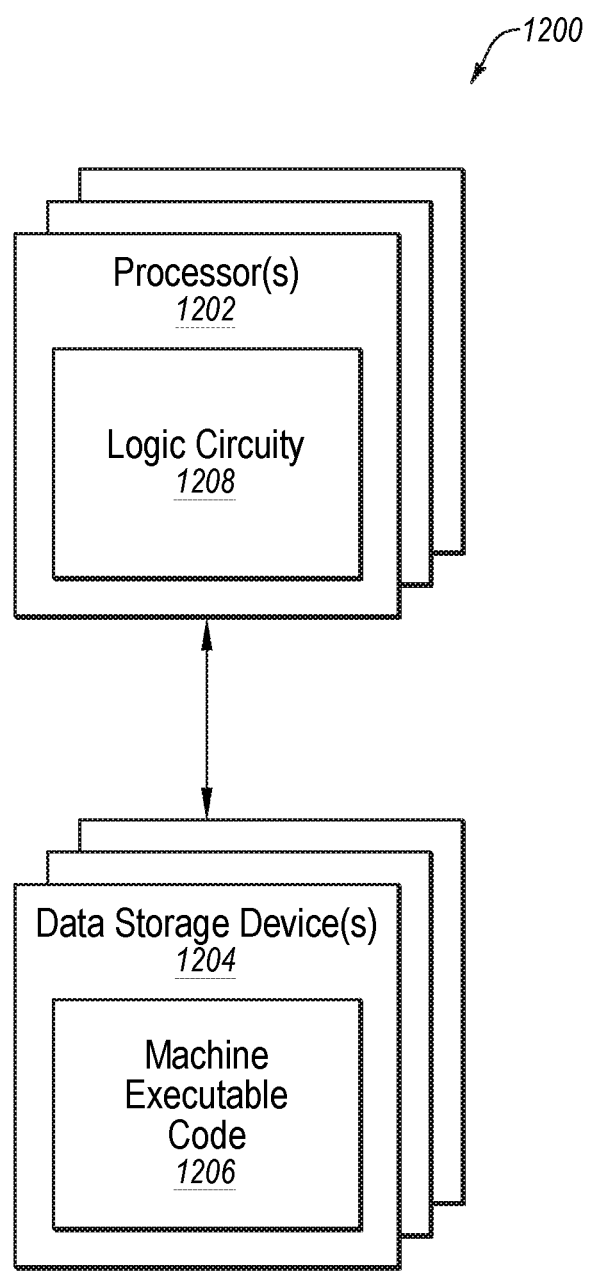
FIG. 12 illustrates a block diagram of circuitry that, in some embodiments, may be used to implement various functions, operations, acts, processes, and/or processes disclosed herein.

FIG. 12 is a block diagram of circuitry 1200 that, in some embodiments, may be used to implement various functions, operations, acts, processes, and/or methods disclosed herein. The circuitry 1200 includes one or more processors 1202 (sometimes referred to herein as "processors 1202") operably coupled to one or more data storage devices (sometimes referred to herein as "storage 1204"). The storage 1204 includes machine executable code 1206 stored thereon and the processors 1202 include logic circuitry 1208. The machine executable code 1206 include information describing functional elements that may be implemented by (e.g., performed by) the logic circuitry 1208. The logic circuitry 1208 is adapted to implement (e.g., perform) the functional elements described by the machine executable code 1206. The circuitry 1200, when executing the functional elements described by the machine executable code 1206, should be considered as special purpose hardware configured for carrying out functional elements disclosed herein. In some embodiments the processors 1202 may be configured to perform the functional elements described by the machine executable code 1206 sequentially, concurrently (e.g., on one or more different hardware platforms), or in one or more parallel process streams.

When implemented by logic circuitry 1208 of the processors 1202, the machine executable code 1206 is configured to adapt the processors 1202 to perform operations of embodiments disclosed herein. For example, the machine executable code 1206 may be configured to adapt the processors 1202 to perform at least a portion or a totality of the process 1100 of FIG. 11 and signal-conditioning flow 400 of FIG. 4. As another example, the machine executable code 1206 may be configured to adapt the processors 1202 to perform at least a portion or a totality of the operations discussed for the authentication unit 110, power control unit 112, and/or signal-conditioning unit 108 of FIGS. 1, 5, 6A and 6B, one-wire authentication element 204 of FIGS. 2 and 3, the communication interface 916, signal-conditioning unit 914, power control unit 920, and authentication unit 110 of FIG. 9. As a specific, non-limiting example, the computer-readable instructions may be configured to instruct the processors 1202 to authenticate a replaceable module for operable coupling with user device.

The processors 1202 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, the processors 1202 may include any conventional processor, controller, microcontroller, or state machine. The processors 1202 may also be implemented as a combination of computing devices, such as a combination of a DSP and a microprocessor, a plurality of microprocessors, one or more microprocessors in conjunction with a DSP core, or any other such configuration.

In some embodiments the storage 1204 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1202 and the storage 1204 may be implemented into a single device (e.g., a semiconductor device product, a system on chip (SOC), etc.). In some embodiments the processors 1202 and the storage 1204 may be implemented into separate devices.

In some embodiments the machine executable code 1206 may include computer-readable instructions (e.g., software code, firmware code). By way of non-limiting example, the computer-readable instructions may be stored by the storage 1204, accessed directly by the processors 1202, and executed by the processors 1202 using at least the logic circuitry 1208. Also by way of non-limiting example, the computer-readable instructions may be stored on the storage 1204, transferred to a memory device (not shown) for execution, and executed by the processors 1202 using at least the logic circuitry 1208. Accordingly, in some embodiments the logic circuitry 1208 includes electrically configurable logic circuitry 1208.

In some embodiments the machine executable code 1206 may describe hardware (e.g., circuitry) to be implemented in the logic circuitry 1208 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1208 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 1206 may include an HDL, an RTL, a GL description, a mask level description, other hardware description, or any combination thereof.

In embodiments where the machine executable code 1206 includes a hardware description (at any level of abstraction), a system (not shown, but including the storage 1204) may be configured to implement the hardware description described by the machine executable code 1206. By way of non-limiting example, the processors 1202 may include a programmable logic device (e.g., an FPGA or a PLC) and the logic circuitry 1208 may be electrically controlled to implement circuitry corresponding to the hardware description into the logic circuitry 1208. Also by way of non-limiting example, the logic circuitry 1208 may include hard-wired logic manufactured by a manufacturing system (not shown, but including the storage 1204) according to the hardware description of the machine executable code 1206.

Regardless of whether the machine executable code 1206 includes computer-readable instructions or a hardware description, the logic circuitry 1208 is adapted to perform the functional elements described by the machine executable code 1206 when implementing the functional elements of the machine executable code 1206. It is noted that although a hardware description may not directly describe functional elements, a hardware description indirectly describes functional elements that the hardware elements described by the hardware description are capable of performing.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

One or more non-limiting embodiments of the disclosure include:

In some embodiments, a system may include a replaceable module and a user device. The replaceable module may include an element and a one-wire authentication element in parallel with the element. The user device may be configured for operable coupling with the replaceable module. The user device may include a power source configured to provide power to the element, an authentication unit configured to perform a verification process for verifying authenticity of the replaceable module, and a signal conditioning unit arranged in a communication path between the one-wire authentication element and the authentication unit.

In these or other embodiments, the one-wire authentication element may have an impedance of at least ten times greater than an impedance of the element.

In these or other embodiments, the element and the one-wire authentication element may be arranged in parallel such that the element and the one-wire authentication element form a first current path and a second current path, respectively. In these or other embodiments, the replaceable module may be configured to divide a first current into a second current along the first current path and a third current along the second current path and wherein the third current is usable by the one-wire authentication element to modulate the first current.

In these or other embodiments, the replaceable module further may include a first line that may be electrically coupled to a first side of the element and to an input/output pin of the one-wire authentication element. The replaceable module may also include a second line electrically coupled to a second side of the element and to a ground pin of the one-wire authentication element. In these or other embodiments, the one-wire authentication element may be configured to send and receive signals at one input/output.

In these or other embodiments, the one-wire authentication element may be configured to modulate a first current by altering a second current permitted to flow through the one-wire authentication element.

In these or other embodiments, the one-wire authentication element may be configured to provide an authentication response to an authentication challenge.

In these or other embodiments, the signal conditioning unit may be configured to receive a signal from the one-wire authentication element, condition the signal, and provide the conditioned signal to the authentication unit. In these or other embodiments, the conditioning the signal may include at least one of: removing an offset voltage of the signal, filtering the signal, amplifying the signal, and shaping the signal.

In these or other embodiments, the user device may include a switch controlled by the authentication unit. The authentication unit may be configured to use the switch to allow current to flow through the replaceable module in response to verification of the authenticity of the replaceable module. The authentication unit may be configured to prevent current from flowing through the replaceable module in response to failure of verification of the authenticity of the replaceable module.

In these or other embodiments, the system may include a switch arranged to allow current to flow through the replaceable module when the switch is closed and to prevent current from flowing through the replaceable module when the switch is open. The switch may be controlled by the authentication unit. The authentication unit may be configured to control the switch to communicate to the one-wire authentication element. In these or other embodiments, the authentication unit may be configured to communicate an authentication challenge to the replaceable module by controlling the switch. The one-wire authentication element may be configured to communicate an authentication response by altering a current permitted to flow through the one-wire authentication element. In these or other embodiments, the user device further may include signal-conditioning circuitry configured to: receive a signal from the one-wire authentication element based on the altered current permitted to flow through the one-wire authentication element, condition the signal, and provide the conditioned signal to the authentication unit.

In some embodiments, a system may include a replaceable module. The replaceable module may include a catalyzing element and an authentication element. The system may further include a user device configured for operable coupling to the replaceable module. The system may further include an authentication unit configured to perform a verification process for verifying authenticity of the replaceable module. The authentication unit may be further configured to permit operable coupling between the user device and the replaceable module responsive to verifying the authenticity of the replaceable module. The system may further include a communication interface arranged between the authentication unit and the authentication element of the replaceable module.

In these or other embodiments, while operably coupled, the replaceable module and the user device may form a system configured to perform a process that would deplete an item disposed within an item region.

In these or other embodiments, the communication interface comprises signal-conditioning circuitry.

In these or other embodiments, permitting operable coupling may include permitting flow of power to the catalyzing element of the replaceable module.

In some embodiments, a method may include connecting a replaceable module to a user device. The replaceable module and the user device, when operably coupled, may form a system that performs a process for depleting an item. The method may also include, receiving an authentication response. The method may also include, conditioning a first signal carrying the authentication response thereby generating a conditioned signal carrying the authentication response that is detectable by an authentication unit. The method may also include, performing a verification process using the authentication response carried by the conditioned signal. The method may also include, in response to performing the verification process, operably coupling the replaceable module to the user device in response to verifying the authentication response. Alternatively, the method may also include, refraining from operably coupling the replaceable module to the user device in response to failing to verify the authentication response.

In these or other embodiments, the conditioning the first signal carrying the authentication response may include removing an offset present in the first signal.

In these or other embodiments, the conditioning the first signal carrying the authentication response may include obtaining a filtered signal by filtering the first signal, obtaining an amplified signal by amplifying the filtered signal, and obtaining a digital signal by waveform shaping the amplified signal.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A system comprising:
    a replaceable module comprising:
        an element electrically coupled between a first line and a second line;
        and a one-wire authentication element electrically in parallel with the element between the first line and the second line; wherein the element and the one-wire authentication element form a first current path and a second current path, respectively and wherein the replaceable module to divide a first current into a second current along the first current path and a third current along the second current path and wherein the third current is usable by the one-wire authentication element to modulate the first current;
    and a user device to operably couple with the replaceable module, the user device comprising:
        a power source to provide power to the element;
        an authentication unit to perform a verification process to verify authenticity of the replaceable module; and
        a signal conditioning unit arranged in a communication path between the one-wire authentication element and the authentication unit.

2. The system of claim 1, wherein the one-wire authentication element has an impedance of at least ten times greater than an impedance of the element.

3. The system of claim 1, wherein the replaceable module comprises:
    the first line electrically coupled to a first side of the element and to an input/output pin of the one-wire authentication element; and
    the second line electrically coupled to a second side of the element and to a ground pin of the one-wire authentication element.

4. The system of claim 3, wherein the one-wire authentication element to send and receive signals at the input/output pin.

5. The system of claim 1, wherein the one-wire authentication element to modulate the first current by altering the third current.

6. The system of claim 1, wherein the one-wire authentication element to provide an authentication response to an authentication challenge.

7. The system of claim 1, wherein the signal conditioning unit to receive a signal from the one-wire authentication element, condition the signal, and provide the conditioned signal to the authentication unit.

8. The system of claim 7, wherein conditioning the signal comprises one or more of: removing an offset voltage of the signal, filtering the signal, amplifying the signal, and shaping the signal.

9. The system of claim 1, wherein the user device comprises a switch controlled by the authentication unit and wherein the authentication unit to use the switch to allow current to flow through the replaceable module in response to verification of the authenticity of the replaceable module and wherein the authentication unit to prevent current from flowing through the replaceable module in response to failure of verification of the authenticity of the replaceable module.

10. The system of claim 1, comprising a switch arranged to allow current to flow through the replaceable module when the switch is closed and to prevent current from flowing through the replaceable module when the switch is open, the switch controlled by the authentication unit, the authentication unit to control the switch to communicate to the one-wire authentication element.

11. The system of claim 10, wherein the authentication unit to communicate an authentication challenge to the replaceable module by controlling the switch and the one-wire authentication element to communicate an authentication response by altering the third current.

12. The system of claim 11, wherein the user device comprises signal-conditioning circuitry to: receive a signal from the one-wire authentication element based on the modulated first current, condition the signal, and provide the conditioned signal to the authentication unit.

* * * * *